US012613439B2

(12) United States Patent
Waldern et al.

(10) Patent No.: US 12,613,439 B2
(45) Date of Patent: Apr. 28, 2026

(54) SYSTEMS AND METHODS FOR MANUFACTURING WAVEGUIDE CELLS

(71) Applicant: DigiLens Inc., Sunnyvale, CA (US)

(72) Inventors: Jonathan David Waldern, Diablo, CA (US); Ratson Morad, Palo Alto, CA (US); Alastair John Grant, San Jose, CA (US); Sihui He, Sunnyvale, CA (US); Shibu Abraham, Sunnyvale, CA (US); Milan Momcilo Popovich, Leicester (GB)

(73) Assignee: DigiLens Inc., Sunnyvale, CA (US)

( * ) Notice: Subject to any disclaimer, the term of this patent is extended or adjusted under 35 U.S.C. 154(b) by 0 days.

(21) Appl. No.: 18/882,593

(22) Filed: Sep. 11, 2024

(65) Prior Publication Data

US 2025/0189835 A1 Jun. 12, 2025

Related U.S. Application Data

(63) Continuation of application No. 17/136,884, filed on Dec. 29, 2020, now Pat. No. 12,092,914, which is a
(Continued)

(51) Int. Cl.
*G02F 1/13* (2006.01)
*B05C 5/00* (2006.01)
(Continued)

(52) U.S. Cl.
CPC ............ *G02F 1/1326* (2013.01); *B05C 5/004* (2013.01); *B05C 5/0204* (2013.01);
(Continued)

(58) Field of Classification Search
CPC .......... G02B 2006/121; G02B 27/0172; G02B 2006/12116; G02B 2006/12166;
(Continued)

(56) References Cited

U.S. PATENT DOCUMENTS

| | | | |
|---|---|---|---|
| 3,804,496 A | 4/1974 | Crane et al. | |
| 4,028,725 A | 6/1977 | Lewis | |

(Continued)

FOREIGN PATENT DOCUMENTS

| | | |
|---|---|---|
| CN | 1066936 A | 12/1992 |
| CN | 1320217 A | 10/2001 |

(Continued)

OTHER PUBLICATIONS

Patent Family for U.S. Appl. No. 18/882,593.*
(Continued)

*Primary Examiner* — Sonya M Sengupta
(74) *Attorney, Agent, or Firm* — Bodman PLC

(57) ABSTRACT

Systems for the manufacturing of waveguide cells in accordance with various embodiments can be configured and implemented in many different ways. In many embodiments, various deposition mechanisms are used to deposit layer(s) of optical recording material onto a transparent substrate. A second transparent substrate can be provided, and the three layers can be laminated to form a waveguide cell. Suitable optical recording material can vary widely depending on the given application. In some embodiments, the optical recording material deposited has a similar composition throughout the layer. In a number of embodiments, the optical recording material spatially varies in composition, allowing for the formation of optical elements with varying characteristics. Regardless of the composition of the optical recording material, any method of placing or depositing the optical recording material onto a substrate can be utilized.

6 Claims, 14 Drawing Sheets

Related U.S. Application Data continuation of application No. 16/203,071, filed on Nov. 28, 2018, now abandoned.

(60) Provisional application No. 62/703,329, filed on Jul. 25, 2018, provisional application No. 62/667,891, filed on May 7, 2018, provisional application No. 62/663,864, filed on Apr. 27, 2018, provisional application No. 62/614,813, filed on Jan. 8, 2018, provisional application No. 62/614,831, filed on Jan. 8, 2018, provisional application No. 62/614,932, filed on Jan. 8, 2018.

(51) Int. Cl.

| | |
|---|---|
| *B05C 5/02* | (2006.01) |
| *B29D 11/00* | (2006.01) |
| *B82Y 20/00* | (2011.01) |
| *G02B 5/18* | (2006.01) |
| *G02B 5/30* | (2006.01) |
| *G02B 6/12* | (2006.01) |
| *G02B 6/122* | (2006.01) |
| *G02B 6/13* | (2006.01) |
| *G02B 27/00* | (2006.01) |
| *G02B 27/01* | (2006.01) |
| *G02B 27/09* | (2006.01) |
| *G03H 1/00* | (2006.01) |

(52) U.S. Cl.
CPC .......... *B05C 5/0291* (2013.01); *B05C 5/0295* (2013.01); *B29D 11/0074* (2013.01); *B29D 11/00769* (2013.01); *B82Y 20/00* (2013.01); *G02B 5/1828* (2013.01); *G02B 5/1857* (2013.01); *G02B 6/122* (2013.01); *G02B 6/13* (2013.01); *G02B 27/0081* (2013.01); *G02B 27/0172* (2013.01); *G02B 27/0944* (2013.01); *G03H 1/00* (2013.01); *G02B 5/1871* (2013.01); *G02B 5/3016* (2013.01); *G02B 2006/12107* (2013.01); *G02B 2006/12116* (2013.01); *G02B 2006/12166* (2013.01); *G02B 2207/101* (2013.01)

(58) Field of Classification Search
CPC .......... G02B 2207/101; G02B 27/0081; G02B 27/0944; G02B 5/1828; G02B 5/1857; G02B 5/1871; G02B 5/3016; G02B 6/122; G02B 6/13; G02B 6/138; G02B 6/4204; B29D 11/00432; B29D 11/00682; B29D 11/0074; B29D 11/00769; B05C 5/004; B05C 5/0204; B05C 5/0291; B05C 5/0295; G03H 1/0248; G03H 1/00; G03H 1/02; G03H 1/0408; G03H 1/0465; G03H 1/30; G03H 2001/0434; G03H 2001/0439; G03H 2222/34; G03H 2223/16; G03H 2223/24; G03H 2223/50; G03H 2227/03; G03H 2227/04; G03H 2227/05; G03H 2260/34
See application file for complete search history.

(56) References Cited

U.S. PATENT DOCUMENTS

| | | |
|---|---|---|
| 4,038,110 A | 7/1977 | Feng |
| 4,403,827 A | 9/1983 | Bryan et al. |
| 4,741,926 A | 5/1988 | White et al. |
| 4,794,021 A | 12/1988 | Potter |
| 4,852,988 A | 8/1989 | Velez et al. |
| 5,166,989 A | 11/1992 | Kurdi et al. |
| 5,210,801 A | 5/1993 | Fournier et al. |
| 5,410,376 A | 4/1995 | Cornsweet et al. |
| 5,462,700 A | 10/1995 | Beeson et al. |
| 5,481,385 A | 1/1996 | Zimmerman et al. |
| 5,544,268 A | 8/1996 | Bischel et al. |
| 5,736,424 A | 4/1998 | Prybyla et al. |
| 5,760,960 A | 6/1998 | Lin et al. |
| 5,771,320 A | 6/1998 | Stone |
| 5,911,018 A | 6/1999 | Bischel et al. |
| 6,084,998 A | 7/2000 | Straayer |
| 6,124,954 A | 9/2000 | Popovich et al. |
| 6,172,792 B1 | 1/2001 | Jepsen et al. |
| 6,185,015 B1 | 2/2001 | Reinhorn et al. |
| 6,215,579 B1 | 4/2001 | Bloom et al. |
| 6,218,316 B1 | 4/2001 | Marsh |
| 6,281,457 B1 | 8/2001 | Chang |
| 6,335,224 B1 | 1/2002 | Peterson et al. |
| 6,339,486 B1 | 1/2002 | Popovich |
| 6,351,273 B1 | 2/2002 | Lemelson et al. |
| 6,510,263 B1 | 1/2003 | Maisenhoelder et al. |
| 6,545,808 B1 | 4/2003 | Ehbets et al. |
| 6,560,019 B2 | 5/2003 | Nakai |
| 6,624,943 B2 | 9/2003 | Nakai et al. |
| 6,678,093 B1 | 1/2004 | Scobey et al. |
| 6,680,720 B1 | 1/2004 | Lee et al. |
| 6,842,563 B2 | 1/2005 | Zhang et al. |
| 6,864,931 B1 | 3/2005 | Kumar et al. |
| 6,876,791 B2 | 4/2005 | Murashima et al. |
| 7,050,674 B2 | 5/2006 | Lee et al. |
| 7,167,616 B2 | 1/2007 | Ling et al. |
| 7,218,817 B2 | 5/2007 | Magnusson et al. |
| 7,248,765 B2 | 7/2007 | Lee et al. |
| 7,280,722 B2 | 10/2007 | Temkin et al. |
| 7,349,612 B2 | 3/2008 | Nishii et al. |
| 7,356,218 B2 | 4/2008 | Kato et al. |
| 7,356,224 B2 | 4/2008 | Levner et al. |
| 7,389,023 B2 | 6/2008 | Yeo et al. |
| 7,394,961 B2 | 7/2008 | Kornilovich et al. |
| 7,542,210 B2 | 6/2009 | Chirieleison |
| 7,672,024 B2 | 3/2010 | Kuan |
| 7,675,021 B2 | 3/2010 | Lapstun |
| 7,675,684 B1 | 3/2010 | Weissman et al. |
| 7,711,228 B2 | 5/2010 | Noda et al. |
| 7,936,513 B2 | 5/2011 | Wu et al. |
| 8,105,662 B2 | 1/2012 | Cherkaoui et al. |
| 8,120,848 B2 | 2/2012 | Isano |
| 8,152,353 B2 | 4/2012 | Yang et al. |
| 8,202,405 B2 | 6/2012 | Meneghini et al. |
| 8,335,414 B2 | 12/2012 | Zinoviev et al. |
| 8,396,341 B2 | 3/2013 | Lee et al. |
| 8,493,562 B2 | 7/2013 | Kopp et al. |
| 8,503,841 B2 | 8/2013 | Kopp et al. |
| 8,929,589 B2 | 1/2015 | Publicover et al. |
| 9,122,015 B2 | 9/2015 | Shimizu |
| 9,188,717 B2 | 11/2015 | Nishiwaki |
| 9,239,507 B2 | 1/2016 | Chen et al. |
| 9,316,786 B2 | 4/2016 | Nishiwaki et al. |
| 9,335,548 B1 | 5/2016 | Cakmakci et al. |
| 9,435,961 B2 | 9/2016 | Jiang |
| 9,484,482 B2 | 11/2016 | Hsu et al. |
| 9,519,115 B2 | 12/2016 | Yashiki et al. |
| 9,739,950 B2 | 8/2017 | Sqalli et al. |
| 9,791,703 B1 | 10/2017 | Vallius et al. |
| 9,857,605 B2 | 1/2018 | Popovich et al. |
| 9,891,436 B2 | 2/2018 | Wall et al. |
| 9,899,800 B2 | 2/2018 | Ferrotti et al. |
| 9,915,825 B2 | 3/2018 | Robbins et al. |
| 9,939,577 B2 | 4/2018 | Inoue et al. |
| 9,939,628 B2 | 4/2018 | Basset et al. |
| 9,959,818 B2 | 5/2018 | Bohn |
| 9,989,763 B2 | 6/2018 | Woltman et al. |
| 10,025,093 B2 | 7/2018 | Wall et al. |
| 10,067,347 B2 | 9/2018 | Vallius et al. |
| 10,088,675 B1 | 10/2018 | Brown et al. |
| 10,088,686 B2 | 10/2018 | Robbins et al. |
| 10,095,045 B2 | 10/2018 | Robbins et al. |
| 10,107,966 B1 | 10/2018 | Horibe et al. |
| 10,114,220 B2 | 10/2018 | Grey et al. |
| 10,126,552 B2 | 11/2018 | Brown et al. |
| 10,145,533 B2 | 12/2018 | Popovich et al. |

(56)　　References Cited

U.S. PATENT DOCUMENTS

| | | | |
|---|---|---|---|
| 10,162,181 B2 | 12/2018 | Webster et al. | |
| 10,197,804 B2 | 2/2019 | Stenberg et al. | |
| 10,241,332 B2 | 3/2019 | Vallius | |
| 10,247,943 B1 | 4/2019 | Yu et al. | |
| 10,281,725 B2 | 5/2019 | Yokoyama | |
| 10,345,519 B1 | 7/2019 | Miller et al. | |
| 10,359,627 B2 | 7/2019 | Wall et al. | |
| 10,359,635 B2 | 7/2019 | Grey et al. | |
| 10,423,222 B2 | 9/2019 | Popovich et al. | |
| 10,437,051 B2 | 10/2019 | Popovich et al. | |
| 10,437,064 B2 | 10/2019 | Popovich et al. | |
| 10,444,510 B1 | 10/2019 | Lee et al. | |
| 10,459,145 B2 | 10/2019 | Popovich et al. | |
| 10,509,241 B1 | 12/2019 | Robbins et al. | |
| 10,551,616 B2 | 2/2020 | Wall et al. | |
| 10,560,688 B2 | 2/2020 | Robbins | |
| 10,591,756 B2 | 3/2020 | Popovich et al. | |
| 10,670,876 B2 | 6/2020 | Popovich et al. | |
| 10,690,851 B2 | 6/2020 | Waldern et al. | |
| 10,690,915 B2 | 6/2020 | Popovich et al. | |
| 10,698,214 B2 | 6/2020 | Vallius et al. | |
| 10,712,571 B2 | 7/2020 | Popovich et al. | |
| 10,725,312 B2 | 7/2020 | Popovich et al. | |
| 10,746,989 B2 | 8/2020 | Brown et al. | |
| 10,747,982 B2 | 8/2020 | Popovich et al. | |
| 10,795,160 B1 | 10/2020 | Stanley et al. | |
| 10,859,837 B2 | 12/2020 | Adema et al. | |
| 10,914,950 B2 | 2/2021 | Waldern et al. | |
| 10,942,430 B2 | 3/2021 | Waldern et al. | |
| 10,983,340 B2 | 4/2021 | Popovich et al. | |
| 10,983,346 B2 | 4/2021 | Vallius et al. | |
| 11,009,699 B2 | 5/2021 | Popovich et al. | |
| 11,106,048 B2 | 8/2021 | Popovich et al. | |
| 11,169,314 B2 | 11/2021 | Popovich et al. | |
| 11,175,512 B2 | 11/2021 | Waldern et al. | |
| 11,194,098 B2 | 12/2021 | Waldern et al. | |
| 11,194,159 B2 | 12/2021 | Popovich et al. | |
| 11,194,162 B2 | 12/2021 | Waldern et al. | |
| 11,204,540 B2 | 12/2021 | Popovich et al. | |
| 11,231,544 B2 | 1/2022 | Lin et al. | |
| 11,256,155 B2 | 2/2022 | Popovich et al. | |
| 11,281,013 B2 | 3/2022 | Popovich et al. | |
| 11,300,795 B1 | 4/2022 | Stanley et al. | |
| 11,307,432 B2 | 4/2022 | Popovich et al. | |
| 11,320,571 B2 | 5/2022 | Brown et al. | |
| 11,378,732 B2 | 7/2022 | Waldern et al. | |
| 11,442,222 B2 | 9/2022 | Waldern et al. | |
| 11,448,937 B2 | 9/2022 | Brown et al. | |
| 11,460,621 B2 | 10/2022 | Popovich et al. | |
| 11,487,131 B2 | 11/2022 | Popovich et al. | |
| 11,513,350 B2 | 11/2022 | Waldern et al. | |
| 11,543,594 B2 | 1/2023 | Grant et al. | |
| 11,573,483 B2 | 2/2023 | Waldern et al. | |
| 11,586,046 B2 | 2/2023 | Waldern et al. | |
| 11,592,614 B2 | 2/2023 | Waldern et al. | |
| 11,604,314 B2 | 3/2023 | Popovich et al. | |
| 11,703,645 B2 | 7/2023 | Waldern et al. | |
| 11,726,332 B2 | 8/2023 | Waldern et al. | |
| 11,754,842 B2 | 9/2023 | Popovich et al. | |
| 12,092,914 B2 * | 9/2024 | Waldern ............... G02B 5/1828 | |
| 12,306,585 B2 | 5/2025 | Waldern et al. | |
| 12,366,823 B2 | 7/2025 | Waldern et al. | |
| 2001/0036012 A1 | 11/2001 | Nakai et al. | |
| 2002/0071472 A1 | 6/2002 | Dickson et al. | |
| 2002/0150337 A1 | 10/2002 | Fujimaki | |
| 2002/0167462 A1 | 11/2002 | Lewis et al. | |
| 2003/0025881 A1 | 2/2003 | Hwang | |
| 2003/0039422 A1 | 2/2003 | Nisley et al. | |
| 2003/0076590 A1 | 4/2003 | Kramer | |
| 2003/0129542 A1 | 7/2003 | Shih et al. | |
| 2003/0184868 A1 | 10/2003 | Geist | |
| 2004/0004989 A1 | 1/2004 | Shigeoka | |
| 2004/0057138 A1 | 3/2004 | Tanijiri et al. | |
| 2004/0087049 A1 | 5/2004 | Gill et al. | |
| 2004/0108971 A1 | 6/2004 | Waldern et al. | |
| 2004/0125454 A1 | 7/2004 | Kawasaki et al. | |
| 2004/0200368 A1 | 10/2004 | Ogino et al. | |
| 2005/0047705 A1 | 3/2005 | Domash et al. | |
| 2005/0141811 A1 | 6/2005 | Yang et al. | |
| 2005/0169579 A1 | 8/2005 | Temkin et al. | |
| 2005/0254752 A1 | 11/2005 | Domash et al. | |
| 2006/0262250 A1 | 11/2006 | Hobbs | |
| 2007/0034600 A1 | 2/2007 | Willson et al. | |
| 2007/0053032 A1 | 3/2007 | Popovich | |
| 2007/0070859 A1 | 3/2007 | Hirayama | |
| 2007/0115553 A1 | 5/2007 | Chang-Hasnain et al. | |
| 2007/0146625 A1 | 6/2007 | Ooi et al. | |
| 2008/0112053 A1 | 5/2008 | Levner et al. | |
| 2008/0298740 A1 | 12/2008 | Hlousek | |
| 2009/0001632 A1 | 1/2009 | Stumpe et al. | |
| 2009/0010135 A1 | 1/2009 | Ushiro et al. | |
| 2009/0116790 A1 | 5/2009 | Mossberg et al. | |
| 2009/0128781 A1 | 5/2009 | Li | |
| 2010/0079841 A1 | 4/2010 | Levola | |
| 2010/0084261 A1 | 4/2010 | Lee et al. | |
| 2010/0141905 A1 | 6/2010 | Burke | |
| 2010/0232016 A1 | 9/2010 | Landa et al. | |
| 2010/0260030 A1 | 10/2010 | Yuyama et al. | |
| 2011/0058122 A1 | 3/2011 | Shikii et al. | |
| 2011/0103762 A1 | 5/2011 | Lee et al. | |
| 2011/0216255 A1 | 9/2011 | Miyauchi et al. | |
| 2011/0232211 A1 | 9/2011 | Farahi | |
| 2012/0067864 A1 | 3/2012 | Kusuda et al. | |
| 2012/0287675 A1 | 11/2012 | Mukawa | |
| 2012/0328234 A1 | 12/2012 | Lu et al. | |
| 2013/0051730 A1 | 2/2013 | Travers et al. | |
| 2013/0141934 A1 | 6/2013 | Hartung | |
| 2013/0163928 A1 | 6/2013 | Wang et al. | |
| 2013/0250380 A1 | 9/2013 | Fujikawa et al. | |
| 2013/0286053 A1 | 10/2013 | Fleck et al. | |
| 2013/0300997 A1 | 11/2013 | Popovich et al. | |
| 2014/0002514 A1 | 1/2014 | Richards | |
| 2014/0022616 A1 | 1/2014 | Popovich et al. | |
| 2014/0126175 A1 | 5/2014 | Amitai et al. | |
| 2014/0198896 A1 | 7/2014 | Hemmendorff et al. | |
| 2015/0009550 A1 | 1/2015 | Misago et al. | |
| 2015/0177443 A1 | 6/2015 | Faecke et al. | |
| 2015/0205126 A1 | 7/2015 | Schowengerdt | |
| 2015/0211960 A1 | 7/2015 | Shimizu | |
| 2015/0262424 A1 | 9/2015 | Tabaka et al. | |
| 2016/0055822 A1 | 2/2016 | Bell | |
| 2016/0085008 A1 | 3/2016 | Banerjee et al. | |
| 2016/0124241 A1 | 5/2016 | Popovich et al. | |
| 2016/0147067 A1 | 5/2016 | Hua et al. | |
| 2016/0170226 A1 | 6/2016 | Popovich et al. | |
| 2016/0205256 A1 | 7/2016 | Low et al. | |
| 2016/0274356 A1 | 9/2016 | Mason | |
| 2016/0363840 A1 | 12/2016 | Mizoguchi et al. | |
| 2016/0370615 A1 | 12/2016 | Wu et al. | |
| 2016/0377879 A1 | 12/2016 | Popovich et al. | |
| 2017/0138789 A1 | 5/2017 | Ivanov | |
| 2017/0160548 A1 | 6/2017 | Woltman et al. | |
| 2017/0176747 A1 | 6/2017 | Vallius et al. | |
| 2017/0192246 A9 | 7/2017 | Popovich et al. | |
| 2017/0192499 A1 | 7/2017 | Trail | |
| 2017/0235142 A1 | 8/2017 | Wall et al. | |
| 2017/0236463 A1 | 8/2017 | Chi et al. | |
| 2017/0270637 A1 | 9/2017 | Perreault et al. | |
| 2017/0299793 A1 | 10/2017 | Fattal | |
| 2017/0299794 A1 | 10/2017 | Fattal | |
| 2017/0299865 A1 | 10/2017 | Vallius et al. | |
| 2017/0307800 A1 | 10/2017 | Fattal | |
| 2017/0322426 A1 | 11/2017 | Tervo | |
| 2017/0329140 A1 | 11/2017 | Yeoh et al. | |
| 2018/0003805 A1 | 1/2018 | Popovich et al. | |
| 2018/0052277 A1 | 2/2018 | Schowengerdt et al. | |
| 2018/0067251 A1 | 3/2018 | Baldwin et al. | |
| 2018/0067318 A1 | 3/2018 | St. Hilaire | |
| 2018/0074340 A1 | 3/2018 | Robbins et al. | |
| 2018/0082644 A1 | 3/2018 | Bohn | |
| 2018/0088325 A1 | 3/2018 | Brown et al. | |
| 2018/0112097 A1 | 4/2018 | Raghavanpillai et al. | |
| 2018/0129060 A1 | 5/2018 | Lee et al. | |
| 2018/0143438 A1 | 5/2018 | Oh | |

(56) References Cited

U.S. PATENT DOCUMENTS

| | | |
|---|---|---|
| 2018/0164583 A1 | 6/2018 | Wall et al. |
| 2018/0172995 A1 | 6/2018 | Lee et al. |
| 2018/0188691 A1 | 7/2018 | Fattal |
| 2018/0203230 A1 | 7/2018 | Vallius et al. |
| 2018/0210205 A1 | 7/2018 | Grey et al. |
| 2018/0265774 A1 | 9/2018 | Huang et al. |
| 2018/0275410 A1 | 9/2018 | Yeoh et al. |
| 2018/0338131 A1 | 11/2018 | Robbins |
| 2018/0348524 A1 | 12/2018 | Blum et al. |
| 2019/0041634 A1 | 2/2019 | Popovich et al. |
| 2019/0064526 A1 | 2/2019 | Connor |
| 2019/0072767 A1 | 3/2019 | Vallius et al. |
| 2019/0114484 A1 | 4/2019 | Keech et al. |
| 2019/0162962 A1 | 5/2019 | Leighton et al. |
| 2019/0162963 A1 | 5/2019 | Leighton et al. |
| 2019/0171031 A1 | 6/2019 | Popovich et al. |
| 2019/0179153 A1 | 6/2019 | Popovich et al. |
| 2019/0187474 A1 | 6/2019 | Bhargava et al. |
| 2019/0188471 A1 | 6/2019 | Osterhout et al. |
| 2019/0212557 A1 | 7/2019 | Waldern et al. |
| 2019/0212573 A1 | 7/2019 | Popovich et al. |
| 2019/0212698 A1* | 7/2019 | Waldern ............... G03H 1/0248 |
| 2019/0226830 A1 | 7/2019 | Edwin et al. |
| 2019/0243142 A1 | 8/2019 | Tekolste et al. |
| 2019/0285796 A1 | 9/2019 | Waldern et al. |
| 2019/0293880 A1 | 9/2019 | Nishiwaki et al. |
| 2019/0361096 A1 | 11/2019 | Popovich et al. |
| 2020/0012839 A1 | 1/2020 | Popovich et al. |
| 2020/0026072 A1 | 1/2020 | Brown et al. |
| 2020/0041787 A1 | 2/2020 | Popovich et al. |
| 2020/0064637 A1 | 2/2020 | Popovich et al. |
| 2020/0089319 A1 | 3/2020 | Popovich et al. |
| 2020/0096692 A1 | 3/2020 | Popovich et al. |
| 2020/0096772 A1 | 3/2020 | Adema et al. |
| 2020/0150469 A1 | 5/2020 | Popovich et al. |
| 2020/0159023 A1 | 5/2020 | Bhargava et al. |
| 2020/0183163 A1 | 6/2020 | Waldern et al. |
| 2020/0192088 A1 | 6/2020 | Yu et al. |
| 2020/0209630 A1 | 7/2020 | Schultz et al. |
| 2020/0241304 A1 | 7/2020 | Popovich et al. |
| 2020/0247017 A1 | 8/2020 | Waldern et al. |
| 2020/0292840 A1 | 9/2020 | Popovich et al. |
| 2020/0319404 A1 | 10/2020 | Waldern et al. |
| 2020/0333606 A1 | 10/2020 | Popovich et al. |
| 2020/0341194 A1 | 10/2020 | Waldern et al. |
| 2020/0341272 A1 | 10/2020 | Popovich et al. |
| 2020/0348531 A1 | 11/2020 | Popovich et al. |
| 2020/0372236 A1 | 11/2020 | Popovich et al. |
| 2020/0386947 A1 | 12/2020 | Waldern et al. |
| 2020/0400946 A1 | 12/2020 | Waldern et al. |
| 2021/0033857 A1 | 2/2021 | Waldern et al. |
| 2021/0055551 A1 | 2/2021 | Chi et al. |
| 2021/0063634 A1 | 3/2021 | Waldern et al. |
| 2021/0063672 A1 | 3/2021 | Bodiya |
| 2021/0088705 A1 | 3/2021 | Drazic et al. |
| 2021/0109353 A1 | 4/2021 | Nicholson et al. |
| 2021/0223585 A1 | 7/2021 | Waldern et al. |
| 2021/0231874 A1 | 7/2021 | Popovich et al. |
| 2021/0231955 A1 | 7/2021 | Waldern et al. |
| 2021/0239984 A1 | 8/2021 | Popovich et al. |
| 2021/0247560 A1 | 8/2021 | Waldern et al. |
| 2021/0247620 A1 | 8/2021 | Popovich et al. |
| 2021/0247719 A1 | 8/2021 | Waldern et al. |
| 2021/0255463 A1 | 8/2021 | Popovich et al. |
| 2021/0278739 A1 | 9/2021 | Brown et al. |
| 2021/0349328 A1 | 11/2021 | Popovich et al. |
| 2021/0364803 A1 | 11/2021 | Schowengerdt et al. |
| 2021/0405299 A1 | 12/2021 | Grant et al. |
| 2021/0405365 A1 | 12/2021 | Popovich et al. |
| 2021/0405514 A1 | 12/2021 | Waldern et al. |
| 2022/0043287 A1 | 2/2022 | Grant et al. |
| 2022/0075196 A1 | 3/2022 | Waldern et al. |
| 2022/0075242 A1 | 3/2022 | Popovich et al. |
| 2022/0099898 A1 | 3/2022 | Waldern et al. |
| 2022/0128754 A1 | 4/2022 | Popovich et al. |
| 2022/0155623 A1 | 5/2022 | Waldern et al. |
| 2022/0163728 A1 | 5/2022 | Waldern et al. |
| 2022/0163801 A1 | 5/2022 | Waldern et al. |
| 2022/0187692 A1 | 6/2022 | Popovich et al. |
| 2022/0214503 A1 | 7/2022 | Waldern et al. |
| 2022/0244559 A1 | 8/2022 | Popovich et al. |
| 2022/0260838 A1 | 8/2022 | Popovich et al. |
| 2022/0260847 A1 | 8/2022 | Popovich et al. |
| 2022/0283377 A1 | 9/2022 | Popovich et al. |
| 2022/0308352 A1 | 9/2022 | Stanley et al. |
| 2022/0317356 A1 | 10/2022 | Popovich et al. |
| 2022/0404538 A1 | 12/2022 | Waldern et al. |
| 2023/0027493 A1 | 1/2023 | Shams et al. |
| 2023/0078253 A1 | 3/2023 | Waldern et al. |
| 2023/0081115 A1 | 3/2023 | Brown et al. |
| 2023/0114549 A1 | 4/2023 | Brown et al. |
| 2023/0168514 A1 | 6/2023 | Waldern et al. |
| 2023/0358962 A1 | 11/2023 | Popovich et al. |
| 2023/0359028 A1 | 11/2023 | Waldern et al. |
| 2023/0359035 A1 | 11/2023 | Waldern et al. |
| 2024/0019640 A1 | 1/2024 | Waldern et al. |
| 2024/0027670 A1 | 1/2024 | Waldern et al. |
| 2024/0103440 A1 | 3/2024 | Popovich et al. |
| 2024/0152094 A1 | 5/2024 | Waldern et al. |
| 2024/0160149 A1 | 5/2024 | Waldern et al. |
| 2024/0160150 A1 | 5/2024 | Waldern et al. |
| 2024/0255760 A1 | 8/2024 | Popovich et al. |
| 2025/0189835 A1* | 6/2025 | Waldern ............... B05C 5/0295 |
| 2025/0284243 A1 | 9/2025 | Waldern et al. |
| 2025/0348039 A1 | 11/2025 | Waldern et al. |

FOREIGN PATENT DOCUMENTS

| | | |
|---|---|---|
| CN | 1602371 A | 3/2005 |
| CN | 1886680 A | 12/2006 |
| CN | 101661265 A | 3/2010 |
| CN | 101726857 A | 6/2010 |
| CN | 101910900 A | 12/2010 |
| CN | 102360093 A | 2/2012 |
| CN | 102608762 A | 7/2012 |
| CN | 102782563 A | 11/2012 |
| CN | 102928981 A | 2/2013 |
| CN | 103000188 A | 3/2013 |
| CN | 103031557 A | 4/2013 |
| CN | 103389580 A | 11/2013 |
| CN | 103946732 A | 7/2014 |
| CN | 103959133 A | 7/2014 |
| CN | 104035157 A | 9/2014 |
| CN | 104040308 A | 9/2014 |
| CN | 104040410 A | 9/2014 |
| CN | 104136952 A | 11/2014 |
| CN | 104520751 A | 4/2015 |
| CN | 106125308 A | 11/2016 |
| CN | 106716223 A | 5/2017 |
| CN | 106842397 A | 6/2017 |
| CN | 107533137 A | 1/2018 |
| CN | 107873086 A | 4/2018 |
| CN | 108107506 A | 6/2018 |
| CN | 109073889 A | 12/2018 |
| CN | 208621784 U | 3/2019 |
| CN | 107873086 B | 3/2020 |
| CN | 111025657 A | 4/2020 |
| CN | 111323867 A | 6/2020 |
| CN | 111386495 A | 7/2020 |
| CN | 305973971 S | 8/2020 |
| CN | 107466372 B | 1/2021 |
| CN | 109073889 B | 4/2021 |
| CN | 108780224 B | 8/2021 |
| CN | 113424095 A | 9/2021 |
| CN | 108474945 B | 10/2021 |
| CN | 113692544 A | 11/2021 |
| CN | 113728258 A | 11/2021 |
| CN | 113759555 A | 12/2021 |
| CN | 114207492 A | 3/2022 |
| CN | 109154717 B | 5/2022 |
| CN | 114450608 A | 5/2022 |
| CN | 111386495 B | 12/2022 |
| CN | 115356905 B | 5/2025 |
| CN | 114721242 B | 8/2025 |

(56) References Cited

FOREIGN PATENT DOCUMENTS

| | | | |
|---|---|---|---|
| DE | 10221837 A1 | 12/2003 | |
| DE | 102006036831 A1 | 2/2008 | |
| EM | 0072341900001 | 11/2019 | |
| EP | 0122133 A1 * | 10/1984 | ............... H01F 5/02 |
| EP | 2196729 A1 | 6/2010 | |
| EP | 2634605 B1 | 10/2015 | |
| EP | 3198192 A1 | 8/2017 | |
| EP | 3245444 A1 | 11/2017 | |
| EP | 3245551 A2 | 11/2017 | |
| EP | 3248026 A1 | 11/2017 | |
| EP | 3398007 A1 | 11/2018 | |
| EP | 2842003 B1 | 2/2019 | |
| EP | 3499278 A1 | 6/2019 | |
| EP | 3245551 B1 | 9/2019 | |
| EP | 3698214 A2 | 8/2020 | |
| EP | 3245444 B1 | 9/2021 | |
| EP | 3894938 A1 | 10/2021 | |
| EP | 3924759 A1 | 12/2021 | |
| EP | 3938821 A1 | 1/2022 | |
| EP | 3980825 A1 | 4/2022 | |
| EP | 4022370 A1 | 7/2022 | |
| EP | 2831659 B1 | 5/2023 | |
| EP | 3433658 B1 | 8/2023 | |
| EP | 3256888 B1 | 4/2024 | |
| EP | 4350422 A2 | 4/2024 | |
| EP | 4517439 A2 | 3/2025 | |
| EP | 3710894 B1 | 7/2025 | |
| FI | 20176158 A1 | 6/2019 | |
| FR | 2975506 A1 | 11/2012 | |
| GB | 2500631 A | 10/2013 | |
| JP | H0566365 A | 3/1993 | |
| JP | H05066427 A | 3/1993 | |
| JP | 5224018 A | 9/1993 | |
| JP | 766383 A | 3/1995 | |
| JP | 2689851 B2 | 12/1997 | |
| JP | H10503279 A | 3/1998 | |
| JP | H11305639 A | 11/1999 | |
| JP | 2002156617 A | 5/2002 | |
| JP | 2003315540 A | 11/2003 | |
| JP | 2005037872 A | 2/2005 | |
| JP | 2007279322 A | 10/2007 | |
| JP | 2007538293 A | 12/2007 | |
| JP | 2009515225 A | 4/2009 | |
| JP | 2009132221 A | 6/2009 | |
| JP | 2010044326 A | 2/2010 | |
| JP | 2010217669 A | 9/2010 | |
| JP | 2010256631 A | 11/2010 | |
| JP | 2011158907 A | 8/2011 | |
| JP | 2011164545 A | 8/2011 | |
| JP | 2012163642 A | 8/2012 | |
| JP | 2012533089 A | 12/2012 | |
| JP | 2013061480 A | 4/2013 | |
| JP | 5588794 B2 | 8/2014 | |
| JP | 5646748 B2 | 11/2014 | |
| JP | 2016186005 A | 10/2016 | |
| JP | 2016188283 A | 11/2016 | |
| JP | 2018512562 A | 5/2018 | |
| JP | 2018519542 A | 7/2018 | |
| JP | 1664536 S | 7/2020 | |
| JP | 2020537187 A | 12/2020 | |
| JP | 6895451 B2 | 6/2021 | |
| JP | 2022513896 A | 2/2022 | |
| JP | 2022520472 A | 3/2022 | |
| JP | 2022525165 A | 5/2022 | |
| JP | 2022091982 A | 6/2022 | |
| JP | 2022535460 A | 8/2022 | |
| JP | 2022546413 A | 11/2022 | |
| JP | 2023044680 A | 3/2023 | |
| JP | 2023083284 A | 6/2023 | |
| JP | 7456929 B2 | 3/2024 | |
| JP | 7695284 B2 | 6/2025 | |
| JP | 7747805 B2 | 9/2025 | |
| KR | 100803288 B1 | 2/2008 | |
| KR | 20170031357 A | 3/2017 | |
| KR | 301061010 S | 5/2020 | |
| KR | 20210100174 A | 8/2021 | |
| KR | 20210134763 A | 11/2021 | |
| KR | 1020210138609 A | 11/2021 | |
| KR | 1020220038452 A | 3/2022 | |
| KR | 1020220054386 A | 5/2022 | |
| KR | 102745805 B1 | 12/2024 | |
| KR | 20250004154 A | 1/2025 | |
| KR | 102768598 B1 | 2/2025 | |
| KR | 20250027583 A | 2/2025 | |
| KR | 102819207 B1 | 6/2025 | |
| KR | 20250089565 A | 6/2025 | |
| WO | 1999031658 A1 | 6/1999 | |
| WO | 2003079414 A2 | 9/2003 | |
| WO | 2004023174 A2 | 3/2004 | |
| WO | 2004053531 A3 | 11/2004 | |
| WO | 2004109349 A2 | 12/2004 | |
| WO | 2004109349 A3 | 1/2005 | |
| WO | 2007058348 A1 | 5/2007 | |
| WO | 2008038058 A1 | 4/2008 | |
| WO | 2010131046 A1 | 11/2010 | |
| WO | 2012136970 A1 | 10/2012 | |
| WO | 2014156167 A1 | 10/2014 | |
| WO | 2016020630 A2 | 2/2016 | |
| WO | 2016020630 A3 | 3/2016 | |
| WO | 2016048729 A1 | 3/2016 | |
| WO | 2016054092 A1 | 4/2016 | |
| WO | 2016087442 A1 | 6/2016 | |
| WO | 2016113533 A2 | 7/2016 | |
| WO | 2016113533 A3 | 10/2016 | |
| WO | 2016162606 A1 | 10/2016 | |
| WO | 2017160367 A1 | 9/2017 | |
| WO | 2020123506 A1 | 6/2020 | |
| WO | 2020163524 A1 | 8/2020 | |
| WO | 2020219092 A1 | 10/2020 | |
| WO | 2020247930 A1 | 12/2020 | |
| WO | 2021021926 A1 | 2/2021 | |
| WO | 2021041949 A1 | 3/2021 | |
| WO | 2021138607 A1 | 7/2021 | |
| WO | 2021242898 A1 | 12/2021 | |
| WO | 2021262759 A1 | 12/2021 | |
| WO | 2022015878 A1 | 1/2022 | |
| WO | 2022099312 A1 | 5/2022 | |
| WO | 2022109615 A1 | 5/2022 | |
| WO | 2022150841 A1 | 7/2022 | |

OTHER PUBLICATIONS

"Compact linear Fresnel reflector", Wikipedia, Sep. 16, 2019, https://en.wikipedia.org/wiki/Compact_linear_Fresnel_reflector, 5 pgs.

Extended European Search Report for European Application No. 18867522.7, Search completed Sep. 15, 2021, Mailed Sep. 24, 2021, 9 pgs.

Extended European Search Report for European Application No. 19897355.4, Search completed Jul. 12, 2022, Mailed Jul. 21, 2022, 8 pgs.

Extended European Search Report for European Application No. 20755316.5, Search completed Nov. 17, 2022, Mailed Nov. 25, 2022, 9 pgs.

Extended European Search Report for European Application No. 20769981.0, Search completed Dec. 7, 2022, Mailed Mar. 23, 2023, 11 pgs.

Extended European Search Report for European Application No. 24158294.9, Search completed Apr. 25, 2024, Mailed May 6, 2024, 7 pgs.

Extended European Search Report for European Application No. 24214043.2, Search completed Apr. 4, 2025, Mailed Apr. 16, 2025, 13 Pgs.

International Preliminary Report on Patentability for International Application No. PCT/GB2016/000005, Report issued Jul. 18, 2017, Mailed Jul. 27, 2017, 7 pgs.

International Preliminary Report on Patentability for International Application No. PCT/IB2008/001909, Report issued Jan. 26, 2010, Mailed Jan. 26, 2010, 5 pgs.

International Preliminary Report on Patentability for International Application No. PCT/GB2013/000210, issued Nov. 11, 2014, Mailed Nov. 20, 2014, 6 pgs.

(56) References Cited

OTHER PUBLICATIONS

International Preliminary Report on Patentability for International Application No. PCT/GB2014/000197, issued Nov. 24, 2015, mailed Dec. 3, 2015, 7 pgs.
International Preliminary Report on Patentability for International Application No. PCT/GB2016/000003, issued Jul. 18, 2017, mailed Jul. 27, 2017, 11 pgs.
International Preliminary Report on Patentability for International Application No. PCT/GB2017/000015, Report Completed Aug. 7, 2018, Mailed Aug. 16, 2018, 7 pgs.
International Preliminary Report on Patentability for International Application No. PCT/US2018/056150, Report Issued on Apr. 21, 2020, Mailed on Apr. 30, 2020, 6 pgs.
International Preliminary Report on Patentability for International Application No. PCT/US2019/047097 issued Sep. 28, 2021, Mailed on Nov. 4, 2021, 8 pgs.
International Preliminary Report on Patentability for International Application No. PCT/US2019/065478, Report issued Jun. 8, 2021, mailed on Jun. 24, 2021, 9 pgs.
International Preliminary Report on Patentability for International Application No. PCT/US2020/018686, Report issued Aug. 10, 2021, Mailed Aug. 26, 2021, 6 pgs.
International Preliminary Report on Patentability for International Application No. PCT/US2020/022482, issued Aug. 25, 2021, Mailed Sep. 23, 2021, 7 pgs.
International Preliminary Report on Patentability for International Application No. PCT/US2020/031363, issued Nov. 2, 2021, Mailed Nov. 18, 2021, 7 pgs.
International Preliminary Report on Patentability for International Application No. PCT/US2020/036654, Report issued Dec. 7, 2021, Mailed Dec. 16, 2021, 10 pgs.
International Preliminary Report on Patentability for International Application No. PCT/US2020/044060, Report issued Feb. 1, 2022, Mailed on Feb. 10, 2022, 8 pgs.
International Preliminary Report on Patentability for International Application No. PCT/US2020/048590, Report issued Mar. 1, 2022, Mailed on Mar. 10, 2022, 13 pgs.
International Preliminary Report on Patentability for International Application No. PCT/US2020/067737, Report issued Jul. 5, 2022, Mailed Jul. 14, 2022, 6 pgs.
International Search Report and Written Opinion for International Application No. PCT/GB2017/000015, Search completed Apr. 25, 2017, Mailed May 8, 2017, 10 pgs.
International Search Report and Written Opinion for International Application No. PCT/IB2008/001909, Search completed Feb. 4, 2009, Mailed Feb. 17, 2009, 6 pgs.
International Search Report and Written Opinion for International Application No. PCT/US2020/036654, Search completed Aug. 21, 2020, Mailed Sep. 4, 2020, 14 pgs.
International Search Report and Written Opinion for International Application No. PCT/US2020/044060, Search completed Oct. 9, 2020, Mailed Nov. 9, 2020, 12 pgs.
International Search Report and Written Opinion for International Application No. PCT/US2020/048590, Search completed Dec. 7, 2020, Mailed Jan. 11, 2021, 19 pgs.
International Search Report and Written Opinion for International Application No. PCT/US2020/067737, Search completed Mar. 3, 2021, Mailed Mar. 25, 2021, 12 pgs.
International Search Report and Written Opinion for International Application No. PCT/US2021/038542, search Completed Sep. 21, 2021, Mailed Oct. 20, 2021, 16 pgs.
International Search Report and Written Opinion for International Application No. PCT/US2021/072287, Search completed Jan. 10, 2022, Mailed Feb. 17, 2022, 11 pgs.
International Search Report and Written Opinion for International Application No. PCT/US2021/072548, Search completed Jan. 25, 2022, Mailed Feb. 8, 2022, 15 pgs.
International Search Report and Written Opinion for International Application No. PCT/US2022/070095, Search completed Mar. 10, 2022, Mailed Mar. 22, 2022, 13 pgs.

International Search Report and Written Opinion for International Application No. PCT/US2019/047097, completed Nov. 22, 2015, mailed Dec. 16, 2019, 10 pgs.
International Search Report and Written Opinion for International Application No. PCT/US2020/016875, Report Completed Apr. 9, 2020, Mailed Apr. 29, 2020, 11 pgs.
International Search Report for International Application No. PCT/GB2013/000210, completed by the European Patent Office on Aug. 12, 2013, 3 pgs.
International Search Report for International Application No. PCT/GB2014/000197, Completed by the European Patent Office on Jul. 31, 2014, 3 pgs.
International Search Report for International Application No. PCT/GB2016/000003, Completed by the European Patent Office May 31, 2016, 5 pgs.
International Search Report for International Application No. PCT/GB2016/000005, completed by the European Patent Office on May 27, 2016, 4 pgs.
Written Opinion for International Application No. PCT/GB2014/000197, Search completed Jul. 31, 2014, Mailed Aug. 7, 2014, 6 pgs.
Written Opinion for International Application No. PCT/GB2013/000210, completed Aug. 12, 2013, Mailed Aug. 20, 2013, 5 pgs.
Written Opinion for International Application No. PCT/GB2016/000005, search completed May 27, 2016, Mailed Jun. 6, 2016, 6 pgs.
Bhuvaneshwaran et al., "Spectral response of Bragg gratings in multimode polymer waveguides", Applied Optics, vol. 56. No. 34, Dec. 1, 2017, pp. 9573-9582, doi: 10.1364/AO.56.009573.
Caputo et al., "POLICRYPS: a liquid crystal composed nano/microstructure with a wide range of optical and electro-optical applications", Journal of Optics A: Pure and Applied Optics, vol. 11, No. 2, Jan. 15, 2009, 13 pgs., doi: 10.1088/1464-4258/11/2/024017.
D'ALESSANDRO et al., "Electro-optic properties of switchable gratings made of polymer and nematic liquid-crystal slices", Optics Letters, vol. 29, No. 12, Jun. 15, 2004, pp. 1405-1407, doi: 10.1364/OL.29.001405.
Escuti et al., "Holographic photonic crystals", Society of Photo-Optical Instrumentation Engineers, vol. 43, No. 9, Sep. 2004, pp. 1973-1987, doi: 10.1117/1.1773773.
Fries et al., "Real-time beam shaping without additional optical elements", Light Science & Applications, vol. 7, No. 18, Jun. 20, 2018, 11 pgs., doi: 10.1038/s41377-018-0014-0.
Gaylord et al., "Thin and thick gratings: terminology clarification", Applied Optics, vol. 20, No. 19, Oct. 1, 1981, pp. 3271-3273, doi: 10.1364/AO.20.003271.
Goodman, "Introduction to Fourier Optics", Second Edition, Jan. 1996, 457 pgs. (Presented in 2 parts).
Konuray et al., "State of the Art in Dual-Curing Acrylate Systems", Polymers, vol. 10, No. 178, Feb. 12, 2018, 24 pgs., doi: 10.3390/polym10020178.
Kwon et al., "Polymer waveguide notch filter using two stacked thermooptic long-period gratings", IEEE Photonics Technology Letters, vol. 17, No. 4, Apr. 4, 2005, pp. 792-794, doi: 10.1109/LPT.2005.844008.
Levin et al., "A Closed Form Solution To Natural Image Matting", Illumination & Displays 3D Visualization and Imaging Systems Laboratory (3DVIS) College of Optical Sciences University of Arizona Tucson, 2014, 8 pgs.
Li et al., "A low cost, label-free biosensor based on a novel double-sided grating waveguide coupler with sub-surface cavities", Sensors and Actuators B: Chemical, vol. 206, Jan. 2015, pp. 371-380, doi: 10.1016/j.snb.2014.09.065.
Matsushima et al., "Thiol-Isocyanate-Acrylate Ternary Networks by Selective Thiol-Click Chemistry", Journal of Polymer Science: Part A: Polymer Chemistry, vol. 48, No. 15, Apr. 16, 2010, pp. 3255-3264, doi: 10.1002/pola.24102.
Missinne et al., "Flexible thin polymer waveguide Bragg grating sensor foils for strain sensing", Proceedings of SPIE, Organic Photonic Materials and Devices, vol. 10101, Feb. 16, 2017, 5 pgs., doi: 10.1117/12.2250823.

(56) References Cited

OTHER PUBLICATIONS

Mulik, "Adhesion Enhancement of Polymeric Films on Glass Surfaces by a Silane Derivative of Azobisisobutyronitrile (AIBN).", Polymer Preprints, American Chemical Society (ACS), Jan. 2008, 3 pgs.

Nielsen et al., "Grating Couplers for Fiber-to-Fiber Characterizations of Stand-Alone Dielectric Loaded Surface Plasmon Waveguide Components", Journal of Lightwave Technology, vol. 30, No. 19, Oct. 1, 2012, pp. 3118-3125, doi: 10.1109/JLT.2012.2212418.

Peng et al., "Facile Image Patterning via Sequential Thiol-Michael/ Thiol-Yne Click Reactions", Chemistry of Materials, vol. 26, No. 23, Nov. 20, 2014, pp. 6819-6826, doi: 10.1021/cm5034436.

Peng et al., "High Performance Graded Rainbow Holograms via Two-Stage Sequential Orthogonal Thiol-Click Chemistry", Macromolecules, vol. 47, No. 7, Mar. 28, 2014, pp. 2306-2315, doi: 10.1021/ma500167x.

Pierantoni et al., "Efficient modeling of 3-D photonic crystals for integrated optical devices", IEEE Photonics Technology Letters, vol. 18, No. 2, Feb. 2006, pp. 319-321, doi: 10.1109/LPT.2005. 861991.

Pogue et al., "Electrically Switchable Bragg Gratings from Liquid Crystal/Polymer Composites", Applied Spectroscopy, vol. 54, No. 1, 2000, pp. 12A-28A, doi: 10.1366/0003702001948097.

Pogue et al., "Monomer functionality effects in the anisotropic phase separation of liquid crystals", Polymer, vol. 41, No. 2, Jan. 2000, pp. 733-741, doi: 10.1016/s0032-3861(99)00196-2.

Prokop et al., "Air-Suspended SU-8 Polymer Waveguide Grating Couplers", Journal of Lightwave Technology, vol. 34, No. 17, Sep. 1, 2016, pp. 3966-3971, doi: 10.1109/JLT.2016.2593025.

Waldern et al., "Waveguide Optics for All Day Wearable Displays", Digilens, Jun. 20, 2017, 35 pgs.

Zeller et al., "Laminated Air Structured and Fluid Infiltrated Polymer Waveguides", IEEE Photonics Technology Letters, vol. 23, No. 21, Nov. 2, 2011, pp. 1564-1566, First published Aug. 12, 2011, doi: 10.1109/LPT.2011.2164396.

* cited by examiner

700

708

706

704

714

712

702

710

718

716

702

736

734

728

722

726

730

732

720

724

X

Y

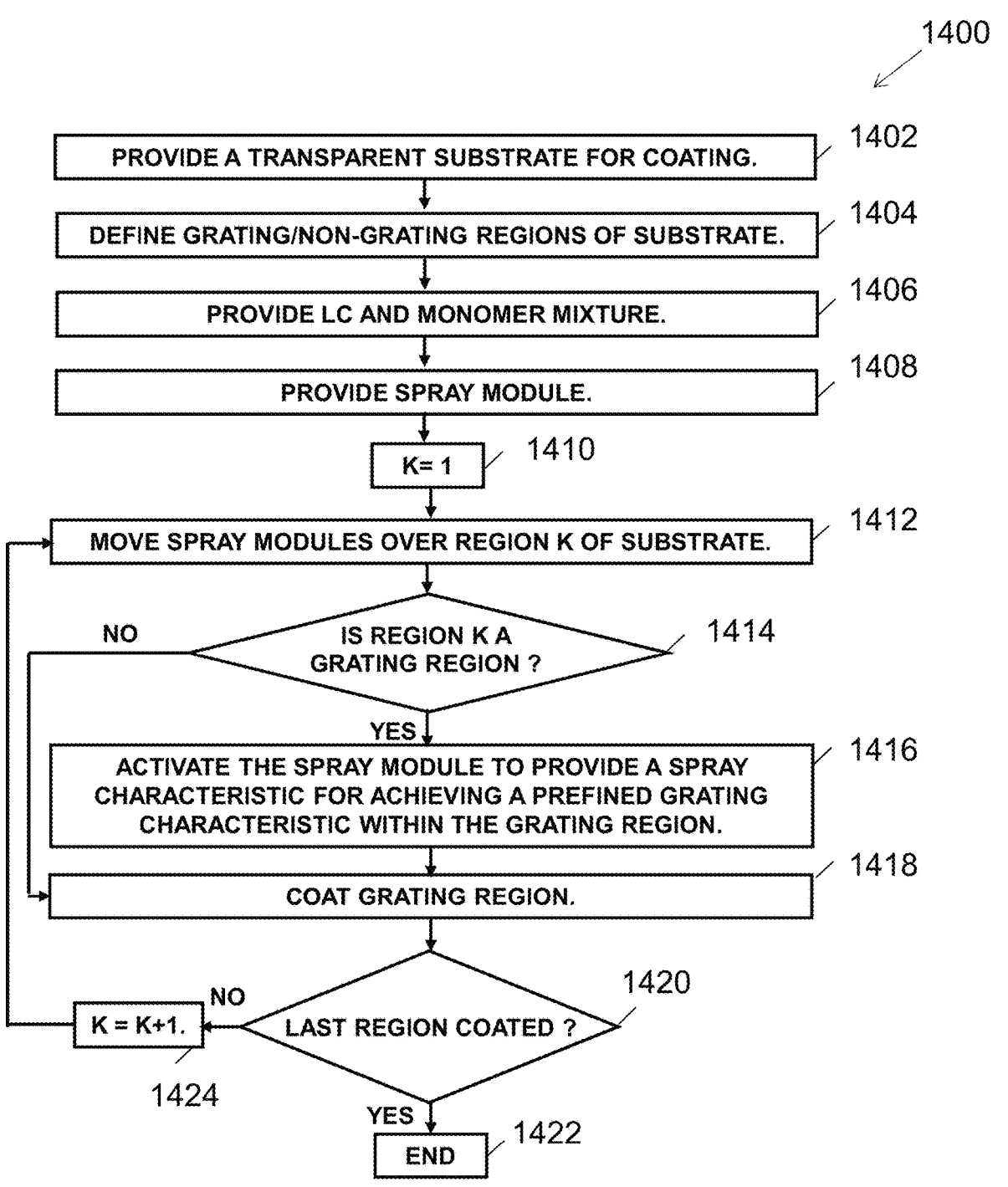

1400

1402 PROVIDE A TRANSPARENT SUBSTRATE FOR COATING.

1404 DEFINE GRATING/NON-GRATING REGIONS OF SUBSTRATE.

1406 PROVIDE LC AND MONOMER MIXTURE.

1408 PROVIDE SPRAY MODULE.

1410 K= 1

1412 MOVE SPRAY MODULES OVER REGION K OF SUBSTRATE.

1414 IS REGION K A GRATING REGION ?    NO

YES

1416 ACTIVATE THE SPRAY MODULE TO PROVIDE A SPRAY CHARACTERISTIC FOR ACHIEVING A PREFINED GRATING CHARACTERISTIC WITHIN THE GRATING REGION.

1418 COAT GRATING REGION.

1420 LAST REGION COATED ?    NO

1424 K = K+1.

YES

1422 END

FIG. 14

SYSTEMS AND METHODS FOR MANUFACTURING WAVEGUIDE CELLS

CROSS-REFERENCE TO RELATED APPLICATIONS

The current application is a divisional of U.S. patent application Ser. No. 17/136,884 entitled "Systems and Methods for Manufacturing Waveguide Cells," filed Dec. 29, 2020, which is a continuation of U.S. patent application Ser. No. 16/203,071 entitled "Systems and Methods for Manufacturing Waveguide Cells," filed Nov. 28, 2018, which application claims the benefit of and priority under 35 U.S.C. § 119(e) to U.S. Provisional Patent Application No. 62/663,864 entitled "Method and Apparatus for Fabricating Holographic Gratings," filed Apr. 27, 2018, U.S. Provisional Patent Application No. 62/614,813 entitled "Low Haze Liquid Crystal Materials," filed Jan. 8, 2018, U.S. Provisional Patent Application No. 62/614,831 entitled "Liquid Crystal Materials and Formulations," filed Jan. 8, 2018, U.S. Provisional Patent Application No. 62/614,932 entitled "Methods for Fabricating Optical Waveguides," filed Jan. 8, 2018, U.S. Provisional Patent Application No. 62/667,891 entitled "Method and Apparatus for Copying a Diversity of Hologram Prescriptions from a Common Master," filed May 7, 2018, and U.S. Provisional Patent Application No. 62/703,329 entitled "Systems and Methods for Fabricating a Multilayer Optical Structure," filed Jul. 25, 2018, the disclosures of which are hereby incorporated by reference in their entireties.

FIELD OF THE INVENTION

The present invention generally relates to processes and apparatuses for manufacturing waveguide cells and, more specifically, manufacturing waveguide cells utilizing deposition and printing techniques.

BACKGROUND

Waveguides can be referred to as structures with the capability of confining and guiding waves (i.e., restricting the spatial region in which waves can propagate). One class of waveguides includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the in-coupled light can proceed to travel within the planar structure via total internal reflection ("TIR").

Fabrication of waveguides can include the use of material systems that allow for the recording of holographic optical elements within the waveguides. One class of such material includes polymer dispersed liquid crystal ("PDLC") mixtures, which are mixtures containing photopolymerizable monomers and liquid crystals. A further subclass of such mixtures includes holographic polymer dispersed liquid crystal ("HPDLC") mixtures. Holographic optical elements, such as volume phase gratings, can be recorded in such a liquid mixture by illuminating the material with two mutually coherent laser beams. During the recording process, the monomers polymerize and the mixture undergoes a photo-polymerization-induced phase separation, creating regions densely populated by liquid crystal micro-droplets, interspersed with regions of clear polymer. The alternating liquid crystal-rich and liquid crystal-depleted regions form the fringe planes of the grating.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for Augmented Reality ("AR") and Virtual Reality ("VR"), compact Heads Up Displays ("HUDs") for aviation and road transport, and sensors for biometric and laser radar ("LI-DAR") applications.

SUMMARY OF THE INVENTION

One embodiment includes a method for manufacturing waveguide cells, the method including providing a first substrate, determining a predefined grating characteristic, and depositing a layer of optical recording material onto the first substrate using at least one deposition head, wherein the optical recording material deposited over the grating region is formulated to achieve the predefined grating characteristic.

In another embodiment, the method further includes providing a second substrate, placing the second substrate onto the deposited layer of optical recording material, and laminating the first substrate, the layer of optical recording material, and the second substrate.

In a further embodiment, depositing the layer of optical recording material includes providing a first mixture of optical recording material, providing a second mixture of optical recording material, and depositing the first and second mixtures of optical recording material onto the first substrate in a predetermined pattern using the at least one deposition head.

In still another embodiment, the first mixture of optical recording material includes a first bead and the second mixture of optical recording material includes a second bead that is a different size from the first bead.

In a still further embodiment, the first mixture of optical recording material has a different percentage by weight of liquid crystals than the second mixture of optical recording material.

In yet another embodiment, the method further includes defining a grating region and a nongrating region on the first substrate, wherein the first mixture of optical recording material includes a liquid crystal and a monomer, the second mixture of optical recording material includes a monomer, and depositing the first and second mixtures of optical recording material onto the first substrate in the predetermined pattern includes depositing the first mixture of optical recording material over the grating region and depositing the second mixture of optical recording material over the nongrating region.

In a yet further embodiment, the first mixture of optical recording material is a polymer dispersed liquid crystal mixture that includes a monomer, a liquid crystal, a photoinitiator dye, and a coinitiator.

In another additional embodiment, the polymer dispersed liquid crystal mixture includes an additive selected from the group that includes a photoinitiator, nano particles, low-functionality monomers, additives for reducing switching voltage, additives for reducing switching time, additives for increasing refractive index modulation, and additives for reducing haze.

In a further additional embodiment, the at least one deposition head includes at least one inkjet print head.

In another embodiment again, depositing the layer of optical recording material includes providing a first mixture of optical recording material, providing a second mixture of optical recording material, printing a first dot of the first mixture of optical recording material using the at least one inkjet print head, and printing a second dot of the second mixture of optical recording material adjacent to the first dot using the at least one inkjet print head.

In a further embodiment again, the at least one inkjet print head includes a first inkjet print head and a second inkjet print head and depositing the layer of optical recording material includes providing a first mixture of optical recording material, providing a second mixture of optical recording material, printing the first mixture of optical recording material onto the first substrate using the first inkjet print head, and printing the second mixture of optical recording material onto the first substrate using the second inkjet print head.

In still yet another embodiment, the predefined grating characteristic includes a characteristic selected from the group that includes refractive index modulation, refractive index, birefringence, liquid crystal director alignment, and grating layer thickness.

In a still yet further embodiment, the predefined grating characteristic includes a spatial variation of a characteristic selected from the group that includes refractive index modulation, refractive index, birefringence, liquid crystal director alignment, and grating layer thickness.

In still another additional embodiment, the predefined grating characteristic results in a grating after exposure, wherein the grating has a spatially varying diffraction efficiency.

A still further additional embodiment includes a system for fabricating a grating, the system including at least one deposition head connected to at least one reservoir containing at least one mixture of optical recording material, a first substrate having at least one predefined region for supporting gratings, a positioning element capable of positioning the at least one deposition head across the first substrate, wherein the at least one deposition head is configured to deposit the at least one mixture of optical recording material onto the first substrate using the positioning element and the deposited material provides a predefined grating characteristic within the at least one predefined grating region after holographic exposure.

In still another embodiment again, the at least one deposition head is connected to a first reservoir containing a first mixture of optical recording material and a second reservoir containing a second mixture of optical recording material.

In a still further embodiment again, the first mixture of optical recording material includes a liquid crystal and a monomer and the second mixture of optical recording material includes a monomer, wherein the at least one deposition head is configured to deposit the first mixture of optical recording material onto the at least one predefined grating region.

In yet another additional embodiment, the at least one deposition head includes at least one inkjet print head.

In a yet further additional embodiment, the predefined grating characteristic includes a characteristic selected from the group that includes refractive index modulation, refractive index, birefringence, liquid crystal director alignment, and grating layer thickness.

In yet another embodiment again, the predefined grating characteristic results in a grating after exposure, wherein the grating has a spatially varying diffraction efficiency.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as exemplary embodiments of the invention and should not be construed as a complete recitation of the scope of the invention. It will apparent to those skilled in the art that the present invention may be practiced with some or all of the present invention as disclosed in the following description.

FIG. 14 is a flow chart conceptually illustrating a method of depositing a film of material with regions having pre-defined grating characteristics in accordance with an embodiment of the invention.

DETAILED DESCRIPTION

Figure 1A:
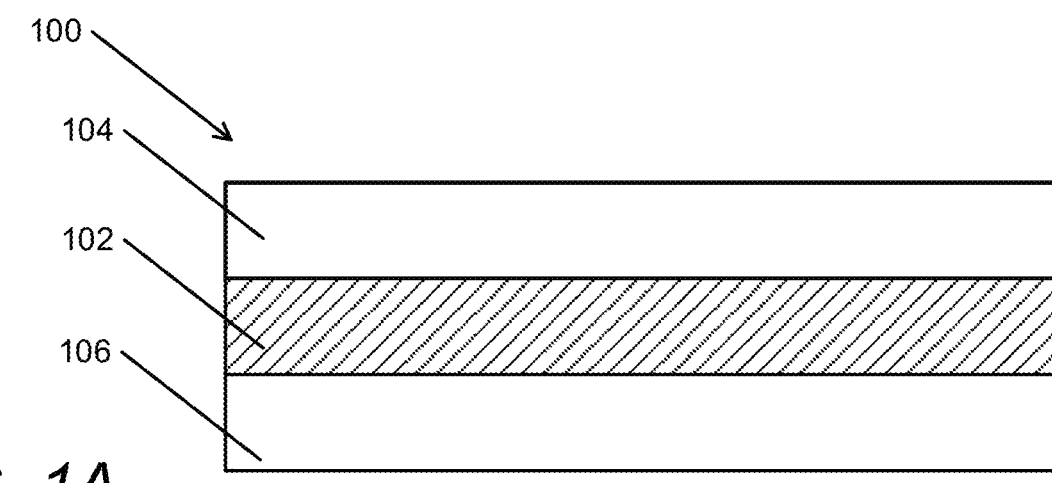
FIG. 1A conceptually illustrates a profile view of a waveguide cell in accordance with an embodiment of the invention.

For the purposes of describing embodiments, some well-known features of optical technology known to those skilled in the art of optical design and visual displays have been omitted or simplified in order to not obscure the basic principles of the invention. Unless otherwise stated, the term "on-axis" in relation to a ray or a beam direction refers to propagation parallel to an axis normal to the surfaces of the optical components described in relation to the invention. In the following description, the terms light, ray, beam and direction may be used interchangeably and in association with each other to indicate the direction of propagation of light energy along rectilinear trajectories. Parts of the following description will be presented using terminology commonly employed by those skilled in the art of optical design. For illustrative purposes, it is to be understood that the drawings are not drawn to scale unless stated otherwise.

Turning now to the drawings, systems and methods for manufacturing waveguide cells are illustrated. A waveguide cell can be defined as a device containing uncured and/or unexposed optical recording material in which optical elements, such as but not limited to gratings, can be recorded through exposure to certain wavelengths of electromagnetic radiation. Many techniques exist for the manufacturing and construction of waveguide cells. In many embodiments, a waveguide cell is constructed by placing a thin film of optical recording material between two transparent substrates. In further embodiments, a workcell cluster manufacturing system is implemented to construct such waveguide cells. A workcell can be defined as a set of machines assigned to a particular manufacturing task. A cluster can be defined as a group of machines that performs a similar function cooperatively. In some embodiments, the workcell cluster includes a preparation workcell for preparing substrates for deposition, a deposition workcell for depositing an optical recording material onto a substrate, and a lamination workcell for laminating various layers together to form a waveguide cell.

Workcells and workcell clusters in accordance with various embodiments can be configured and implemented in many different ways. For instance, preparation workcells can be configured to prepare substrates for material deposition through various processes, including but not limited to cleaning procedures and protocols. In many embodiments, the preparation of substrates includes glass cleaning procedures for ridding the surfaces of the substrates of contaminants and particles. In some embodiments, procedures for increasing the surface adhesion properties of the substrates are implemented to further prepare the substrates for material deposition.

Deposition workcells can be configured to deposit one or more layers of optical recording material onto a transparent substrate using a variety of different deposition and printing mechanisms. In many embodiments, additive manufacturing techniques, such as but not limited to inkjet printing, are used to deposit the layer(s) of optical recording material. In several embodiments, spraying techniques are utilized to deposit the layer(s) of optical recording material. Suitable optical recording material can vary widely depending on the given application. In some embodiments, the optical recording material deposited has a similar composition throughout the layer. In a number of embodiments, the optical recording material spatially varies in composition, allowing for the formation of optical elements with varying characteristics. Regardless of the composition of the optical recording material, any method of placing or depositing the optical recording material onto a substrate can be utilized.

Lamination workcells can be configured to laminate various layers to form a waveguide cell. In a number of embodiments, the lamination workcell is configured to laminate and form a three-layer composite of optical recording material and transparent substrates. As can readily be appreciated, the number of layers and types of materials used to construct the waveguide cells can vary and depend on the given application. For example, in some embodiments, waveguide cells can be constructed to include protective cover layers, polarization control layers, and/or alignment layers. In some embodiments, the system is configured for the production of curved waveguides and waveguide cells. Specific materials, systems, and methods for constructing waveguide cells are discussed below in further detail.

Waveguide Cells

Waveguide cells can be configured and constructed in many different ways in accordance with various embodiments of the invention. As discussed above, in many waveguide configurations, the waveguide cell includes a thin film of optical recording material sandwiched between two substrates. Such waveguide cells can be manufactured using various processes. In many embodiments, waveguide cells can be constructed by coating a first substrate with an optical recording material capable of acting as an optical recording medium. Various optical recording materials can be used. In some embodiments, the optical recording material is a holographic polymer dispersed liquid crystal mixture (e.g., a matrix of liquid crystal droplets). As can readily be appreciated, the choice of optical recording material and types of mixtures utilized can depend on the given application. The optical recording material can be deposited using a variety of deposition techniques. In a number of embodiments, the optical recording material can be deposited onto the first substrate through inkjetting, spin coating, and/or spraying processes. The deposition processes can be configured to deposit one or more type of optical recording material. In some embodiments, the deposition process is configured to deposit optical recording material that spatially varies in composition across a substrate. After deposition of the optical recording material, a second substrate can be placed such that the optical recording material is sandwiched between the two substrates to form a waveguide cell. In several embodiments, the second substrate can be a thin protective film coated onto the exposed layer. In such embodiments, various techniques, including but not limited to spraying processes, can be used to coat the exposed layer with the desired film of material. In a number of embodiments, the waveguide cell can include various additional layers, such as but not limited to polarization control layers and/or alignment layers. Other processes for manufacturing waveguide cells can include filling empty waveguide cells (constructed of two substrates) with an optical recording material using processes such as but not limited to gravity filling and vacuum filling methods.

Substrates used in the construction of waveguide cells are often made of transparent materials. In some embodiments, the substrate is an optical plastic. In other embodiments, the substrate may be fabricated from glass. An exemplary glass substrate is standard Corning Willow glass substrate (index 1.51) which is available in thicknesses down to 50 micrometers. The thicknesses of the substrates can vary from application to application. In many embodiments, 1 mm thick glass slides are used as the substrates. In addition to different thicknesses, substrates of different shapes, such as but not limited to rectangular and curvilinear shapes, can also be used depending on the application. Oftentimes, the shapes of the substrates can determine the overall shape of the waveguide. In a number of embodiments, the waveguide cell contains two substrates that are of the same shape. In other embodiments, the substrates are of different shapes. As can readily be appreciated, the shapes, dimensions, and materials of the substrates can vary and depend on the specific requirements of a given application.

In many embodiments, beads or other particles are dispersed throughout the optical recording material to help control the thickness of the layer of optical recording material and to help prevent the two substrates from collapsing onto one another. In some embodiments, the waveguide cell is constructed with an optical recording material layer sandwiched between two planar substrates. Depending on the type of optical recording material used, thickness control can be difficult to achieve due to the viscosity of some optical recording materials and the lack of a bounding edge for the optical recording material layer. In a number of embodiments, the beads are relatively incompressible solids, which can allow for the construction of waveguide cells with consistent thicknesses. The size of a bead can determine a localized minimum thickness for the area around the individual bead. As such, the dimensions of the beads can be selected to help attain the desired optical recording material layer thickness. The beads can be made of any of a variety of materials, including but not limited to glass and plastics. In several embodiments, the material of the beads is selected such that its refractive index does not substantially affect the propagation of light within the waveguide cell.

In some embodiments, the waveguide cell is constructed such that the two substrates are parallel or substantially parallel. In such embodiments, relatively similar sized beads can be dispersed throughout the optical recording material to help attain a uniform thickness throughout the layer. In other embodiments, the waveguide cell has a tapered profile. A tapered waveguide cell can be constructed by dispersing beads of different sizes across the optical recording material. As discussed above, the size of a bead can determine the local minimum thickness of the optical recording material layer. By dispersing the beads in a pattern of increasing size across the material layer, a tapered layer of optical recording material can be formed when the material is sandwiched between two substrates.

Once constructed, waveguide cells can be used in conjunction with a variety of processes for recording optical elements within the optical recording material. For example, the process disclosed may incorporated embodiments and teachings from the materials and processes, such as but not limited to those described in U.S. patent application Ser. No.

16/116,834 entitled "Systems and Methods for High-Throughput Recording of Holographic Gratings in Waveguide Cells," filed Aug. 29, 2018 and U.S. patent application Ser. No. 16/007,932 entitled "Holographic Material Systems and Waveguides Incorporating Low Functionality Monomers," filed Jun. 13, 2018 The disclosures of U.S. patents application Ser. No. 16/116,834 and Ser. No. 16/007,932 are hereby incorporated in their entireties for all purpose.

Figure 1B:
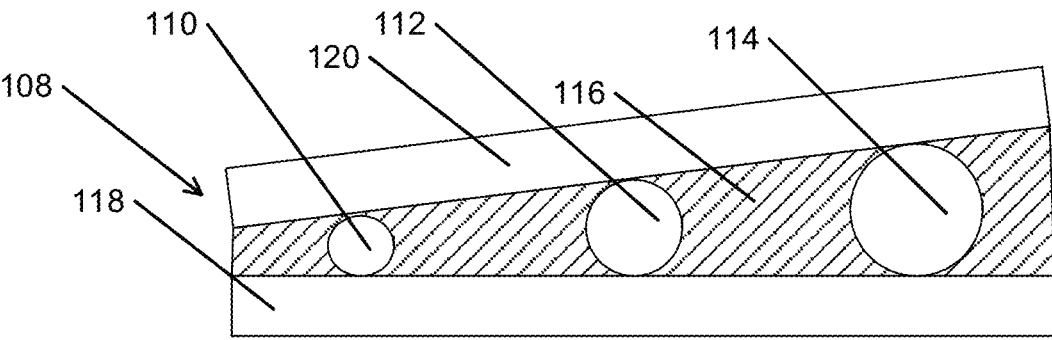
FIG. 1B conceptually illustrates a waveguide cell with a wedge-shaped profile in accordance with an embodiment of the invention.
Figure 1C:
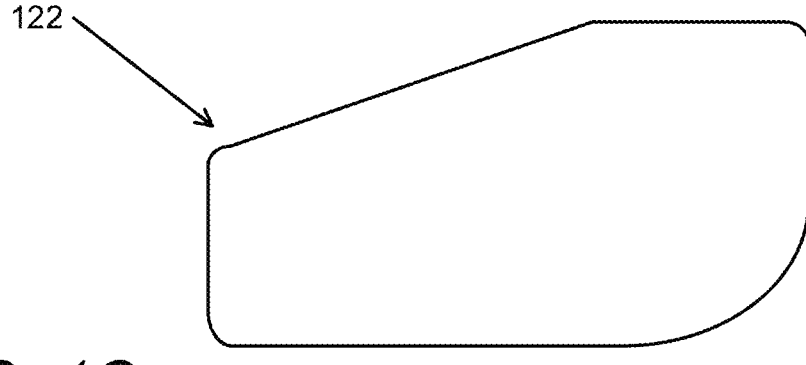
FIG. 1C conceptually illustrates a top view of a waveguide cell in accordance with an embodiment of the invention.

A profile view of a waveguide cell 100 in accordance with an embodiment of the invention is conceptually illustrated in FIG. 1A. As shown, the waveguide cell 100 includes a layer of optical recording material 102 that can be used as a recording medium for optical elements, such as but not limited to gratings. The optical recording material 102 can be any of a variety of compounds, mixtures, or solutions, such as but not limited to the HPDLC mixtures described in the sections above. In the illustrative embodiment, the optical recording material 102 is sandwich between two parallel glass plates 104, 106. The substrates can be arranged in both parallel and non-parallel configurations. FIG. 1B conceptually illustrates a profile view of a tapered waveguide cell 108 utilizing beads 110, 112, and 114 in accordance with an embodiment of the invention. As shown, beads 110, 112, and 114 vary in size and are dispersed throughout an optical recording material 116 sandwiched by two glass plates 118, 120. During construction of the waveguide cell, the local thickness of an area of the optical recording material layer is limited by the sizes of the beads in that particular area. By dispersing the beads in an increasing order of sizes across the optical recording material, a tapered waveguide cell can be constructed when the substrates are placed in contact with the beads. As discussed above, substrates utilized in waveguide cells can vary in thicknesses and shapes. In many embodiments, the substrate is rectangular in shape. In some embodiments, the shape of the waveguide cell is a combination of curvilinear components. FIG. 1C conceptually illustrates a top view of a waveguide cell 122 having a curvilinear shape in accordance with an embodiment of the invention. Although FIGS. 1A-1C illustrate specific waveguide cell constructions and arrangements, waveguide cells can be constructed in many different configurations and can use a variety of different materials depending on the specific requirements of a given application. For example, substrates can be made of transparent plastic polymers instead of glass. Additionally, the shapes and sizes of the waveguide cells can vary greatly and can be determined by various factors, such as but not limited to the application of the waveguide, ergonomic considerations, and economical factors. In many embodiments, the substrates are curved, allowing for the production of waveguides with curved cross sections.

Grating Structures

Waveguide cells in accordance with various embodiments of the invention can incorporate a variety of light-sensitive materials. In many embodiments, the waveguide cell incorporates a holographic polymer dispersed liquid crystal mixture that functions as an optical recording medium in which optical elements can be recorded. Optical elements can include many different types of gratings capable of exhibiting different optical properties. One type of grating that can be recorded in waveguide cells is a volume Bragg grating, which can be characterized as a transparent medium with a periodic variation in its refractive index. This variation can allow for the diffraction of incident light of certain wavelengths at certain angles. Volume Bragg gratings can have high efficiency with little light being diffracted into higher orders. The relative amount of light in the diffracted and zero order can be varied by controlling the refractive index modulation of the grating.

One class of gratings used in holographic waveguide devices is the Switchable Bragg Grating ("SBG"). An SBG is a diffractive device that can be formed by recording a volume phase grating in an HPDLC mixture (although other materials can be used). SBGs can be fabricated by first placing a thin film of a mixture of photopolymerizable monomers and liquid crystal material between glass plates or substrates, which forms a waveguide cell. One or both glass plates can support electrodes, typically transparent tin oxide films, for applying an electric field across the film. SBGs can be implemented as waveguide devices in which the HPDLC forms either the waveguide core or an evanescently coupled layer in proximity to the waveguide. The glass plates used to form the HPDLC cell can provide a total internal reflection light guiding structure. Light is coupled out of the SBG when the switchable grating diffracts the light at an angle beyond the TIR condition.

The grating structure in an SBG can be recorded in the film of HPDLC material through photopolymerization-induced phase separation using interferential exposure with a spatially periodic intensity modulation. Factors such as but not limited to control of the irradiation intensity, component volume fractions of the HPDLC material, and exposure temperature can determine the resulting grating morphology and performance. During the recording process, the monomers polymerize and the mixture undergoes a phase separation. The LC molecules aggregate to form discrete or coalesced droplets that are periodically distributed in polymer networks on the scale of optical wavelengths. The alternating liquid crystal-rich and liquid crystal-depleted regions form the fringe planes of the grating, which can produce Bragg diffraction with a strong optical polarization resulting from the orientation ordering of the LC molecules in the droplets. The resulting volume phase grating can exhibit very high diffraction efficiency, which may be controlled by the magnitude of the electric field applied across the HPDLC layer. When an electric field is applied to the hologram via transparent electrodes, the natural orientation of the LC droplets is changed, causing the refractive index modulation of the fringes to reduce and the hologram diffraction efficiency to drop to very low levels. The diffraction efficiency of the device can be adjusted, by means of the applied voltage, over a continuous range from near 100% efficiency with no voltage applied to essentially zero efficiency with a sufficiently high voltage applied. In certain types of HPDLC devices, phase separation of the LC material from the polymer can be accomplished to such a degree that no discernible droplet structure results. An SBG can also be used as a passive grating. In this mode, its chief benefit is a uniquely high refractive index modulation. SBGs can be used to provide transmission or reflection gratings for free space applications. SBGs can be implemented as waveguide devices in which the HPDLC forms either the waveguide core or an evanescently coupled layer in proximity to the waveguide. The glass plates used to form the HPDLC cell provide a total internal reflection light guiding structure. Light can be coupled out of the SBG when the switchable grating diffracts the light at an angle beyond the TIR condition.

In many embodiments, SBGs are recorded in a uniform modulation material, such as POLICRYPS or POLIPHEM having a matrix of solid liquid crystals dispersed in a liquid polymer. Exemplary uniform modulation liquid crystal-polymer material systems are disclosed in United State Patent Application Publication No.: US2007/0019152 by Caputo et al and PCT Application No.: PCT/EP2005/006950 by Stumpe et al. both of which are incorporated herein by reference in their entireties. Uniform modulation gratings are characterized by high refractive index modulation (and hence high diffraction efficiency) and low scatter. In some embodiments, at least one of the gratings is recorded a reverse mode HPDLC material. Reverse mode HPDLC differs from conventional HPDLC in that the grating is passive when no electric field is applied and becomes diffractive in the presence of an electric field. The reverse mode HPDLC may be based on any of the recipes and processes disclosed in PCT Application No. PCT/GB2012/000680, entitled IMPROVEMENTS TO HOLOGRAPHIC POLYMER DISPERSED LIQUID CRYSTAL MATERIALS AND DEVICES. Optical recording material systems are discussed below in further detail.

Optical Recording Material Systems

HPDLC mixtures in accordance with various embodiments of the invention generally include LC, monomers, photoinitiator dyes, and coinitiators. The mixture (often referred to as syrup) frequently also includes a surfactant. For the purposes of describing the invention, a surfactant is defined as any chemical agent that lowers the surface tension of the total liquid mixture. The use of surfactants in PDLC mixtures is known and dates back to the earliest investigations of PDLCs. For example, a paper by R. L Sutherland et al., SPIE Vol. 2689, 158-169, 1996, the disclosure of which is incorporated herein by reference, describes a PDLC mixture including a monomer, photoinitiator, coinitiator, chain extender, and LCs to which a surfactant can be added. Surfactants are also mentioned in a paper by Natarajan et al, Journal of Nonlinear Optical Physics and Materials, Vol. 5 No. 1 89-98, 1996, the disclosure of which is incorporated herein by reference. Furthermore, U.S. Pat. No. 7,018,563 by Sutherland; et al., discusses polymer-dispersed liquid crystal material for forming a polymer-dispersed liquid crystal optical element including: at least one acrylic acid monomer; at least one type of liquid crystal material; a photoinitiator dye; a coinitiator; and a surfactant. The disclosure of U.S. Pat. No. 7,018,563 is hereby incorporated by reference in its entirety.

The patent and scientific literature contains many examples of material systems and processes that can be used to fabricate waveguides incorporating volume gratings, including investigations into formulating such material systems for achieving high diffraction efficiency, fast response time, low drive voltage, and so forth. U.S. Pat. No. 5,942, 157 by Sutherland, and U.S. Pat. No. 5,751,452 by Tanaka et al. both describe monomer and liquid crystal material combinations suitable for fabricating waveguides incorporating volume gratings. Examples of recipes can also be found in papers dating back to the early 1990s, many of which disclose the use of acrylate monomers, including:

R. L. Sutherland et al., Chem. Mater. 5, 1533 (1993), the disclosure of which is incorporated herein by reference, describes the use of acrylate polymers and surfactants. Specifically, the recipe includes a crosslinking multifunctional acrylate monomer; a chain extender N-vinyl pyrrolidinone, LC E7, photo-initiator rose Bengal, and coinitiator N-phenyl glycine. Surfactant octanoic acid was added in certain variants.

Fontecchio et al., SID initiator 00 Digest 774-776, 2000, the disclosure of which is incorporated herein by reference, describes a UV curable HPDLC for reflective display applications including a multi-functional acrylate monomer, LC, a photoinitiator, a coinitiators, and a chain terminator.

Y. H. Cho, et al., Polymer International, 48, 1085-1090, 1999, the disclosure of which is incorporated herein by reference, discloses HPDLC recipes including acrylates.

Karasawa et al., Japanese Journal of Applied Physics, Vol. 36, 6388-6392, 1997, the disclosure of which is incorporated herein by reference, describes acrylates of various functional orders.

T. J. Bunning et al., Polymer Science: Part B: Polymer Physics, Vol. 35, 2825-2833, 1997, the disclosure of which is incorporated herein by reference, also describes multifunctional acrylate monomers.

G. S. lannacchione et al., Europhysics Letters Vol. 36 (6). 425-430, 1996, the disclosure of which is incorporated herein by reference, describes a PDLC mixture including a penta-acrylate monomer, LC, chain extender, coinitiators, and photoinitiator.

Acrylates offer the benefits of fast kinetics, good mixing with other materials, and compatibility with film forming processes. Since acrylates are cross-linked, they tend to be mechanically robust and flexible. For example, urethane acrylates of functionality 2 (di) and 3 (tri) have been used extensively for HPDLC technology. Higher functionality materials such as penta and hex functional stems have also been used.

Although HPDLC mixtures with specific components are discussed above in relation with their suitable uses as the optical recording material in a waveguide cell, specific formulations of optical recording materials can vary widely and can depend on the specific requirements of a given application. Such considerations can include diffraction efficiency ("DE"), haze, solar immunity, transparency, and switching requirements.

Embodiments of S & P Polarized RMLCM Materials

The S and P polarization response of a grating containing LC can depend on the average LC director orientations relative to the grating K-vector. Typically, the directors are substantially parallel to the K-vector, giving a strong P-response and a weaker S-response. If the LC directors are not aligned, the grating can have a strong S-response. Many embodiments of the invention include reactive monomer liquid crystal mixture ("RMLCM") material systems configured to incorporate a mixture of LCs and monomers (and other components including: photoinitiator dye, coinitiators, surfactant), which under holographic exposure undergo phase separation to provide a grating in which at least one of the LCs and at least one of the monomers form a first HPDLC morphology that provides a P polarization response and at least one of the LCs and at least one of the monomers form a second HPDLC morphology that provides a S polarization response. In various such embodiments, the material systems include an RMLCM, which includes photopolymerizable monomers composed of suitable functional groups (e.g., acrylates, mercapto-, and other esters, among others), a cross-linking agent, a photo-initiator, a surfactant and a liquid crystal.

Turning to the components of the material formulation, any encapsulating polymer formed from any single photo-reactive monomer material or mixture of photo-reactive monomer materials having refractive indices from about 1.5 to 1.9 that crosslink and phase separate when combined can be utilized. Exemplary monomer functional groups usable in material formulations according to embodiments include, but are not limited to, acrylates, thiol-ene, thiol-ester, fluoromonomers, mercaptos, siloxane-based materials, and other esters, etc. Polymer cross-linking can be achieved through different reaction types, including but not limited to optically-induced photo-polymerization, thermally-induced polymerization, and chemically-induced polymerization.

These photopolymerizable materials can be combined in a biphase blend with a second liquid crystal material. Any suitable liquid crystal material having ordinary and extraordinary refractive indices matched to the polymer refractive index can be used as a dopant to balance the refractive index of the final RMLCM material. The liquid crystal material can be manufactured, refined, or naturally occurring. The liquid crystal material includes all known phases of liquid crystallinity, including the nematic and smectic phases, the cholesteric phase, the lyotropic discotic phase. The liquid crystal can exhibit ferroelectric or antiferroelectric properties and/or behavior.

Any suitable photoinitiator, co-initiator, chain extender and surfactant (such as for example octanoic acid) suitable for use with the monomer and LC materials can be used in the RMLCM material formulation. It will be understood that the photo-initiator can operate in any desired spectral band including the in the UV and/or in the visible band.

In various embodiments, the LCs can interact to form an LC mixture in which molecules of two or more different LCs interact to form a non-axial structure which interacts with both S and P polarizations. The waveguide can also contain an LC alignment material for optimizing the LC alignment for optimum S and P performance. In many embodiments, the ratio of the diffraction efficiencies of the P- and S-polarized light in the PDLC morphology is maintained at a relative ratio of from 1.1:1 to 2:1, and in some embodiments at around 1.5:1. In other embodiments, the measured diffraction efficiency of P-polarized light is from greater than 20% to less than 60%, and the diffraction efficiency for S-polarized light is from greater than 10% to less than 50%, and in some embodiments the diffraction efficiency of the PDLC morphology for P-polarization is around 30% and the diffraction efficiency of the PDLC morphology for S-polarization is around 20%. This can be compared with conventional PDLC morphologies where the diffraction efficiency for P-polarization is around 60% and for S-polarization is around 1% (i.e., the conventional P-polarization materials have very low or negligible S-components).

Mixtures Incorporating Nanoparticles

In many embodiments, the reactive monomer liquid crystal mixture can further include chemically active nanoparticles disposed within the LC domains. In some such embodiments, the nanoparticles are carbon nanotube ("CNT") or nanoclay nanoparticle materials within the LC domains. Embodiments are also directed to methods for controlling the nanoclay particle size, shape, and uniformity. Methods for blending and dispersing the nanoclay particles can determine the resulting electrical and optical properties of the device. The use of nanoclays in HPDLC is discussed in PCT Application No.: PCT/GB2012/000680, entitled IMPROVEMENTS TO HOLOGRAPHIC POLYMER DISPERSED LIQUID CRYSTAL MATERIALS AND DEVICES.

The nanoclay nanoparticles can be formed from any naturally occurring or manufactured composition, as long as they can be dispersed in the liquid crystal material. The specific nanoclay material to be selected depends upon the specific application of the film and/or device. The concentration and method of dispersion also depends on the specific application of the film and/or device. In many embodiments, the liquid crystal material is selected to match the liquid crystal ordinary index of refraction with the nanoclay material. The resulting composite material can have a forced alignment of the liquid crystal molecules due to the nanoclay particle dispersion, and the optical quality of the film and/or device can be unaffected. The composite mixture, which includes the liquid crystal and nanoclay particles, can be mixed to an isotropic state by ultrasonication. The mixture can then be combined with an optically crosslinkable monomer, such as acrylated or urethane resin that has been photoinitiated, and sandwiched between substrates to form a cell (or alternatively applied to a substrate using a coating process).

In various embodiments, nanoparticles are composed of nanoclay nanoparticles, preferably spheres or platelets, with particle size on the order of 2-10 nanometers in the shortest dimension and on the order of 10 nanometers in the longest dimension. Desirably, the liquid crystal material is selected to match the liquid crystal ordinary index of refraction with the nanoclay material. Alternatively, the nanoparticles can be composed of material having ferroelectric properties, causing the particles to induce a ferroelectric alignment effect on the liquid crystal molecules, thereby enhancing the electro-optic switching properties of the device. In another embodiment of the invention, the nanoparticles are composed of material having ferromagnetic properties, causing the particles to induce a ferromagnetic alignment effect on the liquid crystal molecules, thereby enhancing the electro-optic switching properties of the device. In another embodiment of the invention, the nanoparticles have an induced electric or magnetic field, causing the particles to induce an alignment effect on the liquid crystal molecules, thereby enhancing the electro-optic switching properties of the device. Exemplary nanoparticles used in other contexts including thermoplastics, polymer binders, etc. are disclosed in U.S. Pat. Nos. 7,068,898; 7,046,439; 6,323,989; 5,847, 787; and U.S. Patent Pub. Nos. 2003/0175004; 2004/ 0156008; 2004/0225025; 2005/0218377; and 2006/ 0142455, the disclosures of which are incorporated herein by reference.

The nanoclay can be used with its naturally occurring surface properties, or the surface can be chemically treated for specific binding, electrical, magnetic, or optical properties. Preferably, the nanoclay particles will be intercalated, so that they disperse uniformly in the liquid crystalline material. The generic term "nanoclay" as used in the discussion of the present invention can refer to naturally occurring montmorillonite nanoclay, intercalated montmorillonite nanoclay, surface modified montmorillonite nanoclay, and surface treated montmorillonite nanoclay. The nanoparticles can be useable as commercially purchased, or they may need to be reduced in size or altered in morphology. The processes that can be used include chemical particle size reduction, particle growth, grinding of wet or dry particles, milling of large particles or stock, vibrational milling of large particles or stock, ball milling of particles or stock, centrifugal ball milling of particles or stock, and vibrational ball milling of particles or stock. All of these techniques can be performed either dry or with a liquid suspension. The liquid suspension can be a buffer, a solvent, an inert liquid, or a liquid crystal material. One exemplary ball milling process provided by Spex LLC (Metuchen, NJ)

is known as the Spex 8000 High Energy Ball Mill. Another exemplary process, provided by Retsch (France), uses a planetary ball mill to reduce micrometer size particles to nanoscale particles.

The nanoparticles can be dispersed in the liquid crystal material prior to polymer dispersion. Dry or solvent suspended nanoparticles can be ultrasonically mixed with the liquid crystal material or monomers prior to polymer dispersion to achieve an isotropic dispersion. Wet particles may need to be prepared for dispersion in liquid crystal, depending on the specific materials used. If the particles are in a solvent or liquid buffer, the solution can be dried, and the dry particles dispersed in the liquid crystal as described above. Drying methods include evaporation in air, vacuum evaporation, purging with inert gas like nitrogen and heating the solution. If the particles are dispersed in a solvent or liquid buffer with a vapor pressure lower than the liquid crystal material, the solution can be mixed directly with the liquid crystal, and the solvent can be evaporated using one of the above methods leaving behind the liquid crystal/nanoparticle dispersion. In one embodiment of the invention, the optical film includes a liquid crystal material and a nanoclay nanoparticle, where a nanoparticle is a particle of material with size less than one micrometer in at least one dimension. The film can be isotropically distributed.

Although nanoclay materials are discussed, in many embodiments CNT is used as an alternative to nanoclay as a means for reducing voltage. The properties of CNT in relation to PDLC devices are reviewed by E. H. Kim et. al. in Polym. Int. 2010; 59:1289-1295, the disclosure of which is incorporated herein by reference in its entirety. PDLC films have been fabricated with varying amounts of multi-walled carbon nanotubes ("MWCNTs") to optimize the electro-optical performance of the PDLC films. The MWCNTs were well dispersed in the prepolymer mixture up to 0.5 wt %, implying that polyurethane acrylate ("PUA") oligomer chains wrap the MWCNTs along their length, resulting in high diffraction efficiency and good phase separation. The hardness and elastic modulus of the polymer matrix were enhanced with increasing amounts of MWCNTs because of the reinforcement effect of the MWCNTs with intrinsically good mechanical properties. The increased elasticity of the PUA matrix and the immiscibility between the matrix and the liquid crystals gradually increased the diffraction efficiency of the PDLC films. However, the diffraction efficiency of PDLC films with more than 0.05 wt % MWCNTs was reduced, caused by poor phase separation between the matrix and LCs because of the high viscosity of the reactive mixture. PDLC films showing a low driving voltage (75%) could be obtained with 0.05 wt % MWCNTs at 40 wt % LCs.

In embodiments where the PDLC materials incorporate such nanoparticles, reductions of switching voltage and improvements to the electro-optic properties of a polymer dispersed liquid crystal film and/or polymer dispersed liquid crystal device can be obtained by including nanoparticles in the liquid crystal domains. The inclusion of nanoparticles serves to align the liquid crystal molecules and to alter the birefringent properties of the film through index of refraction averaging. In addition, the inclusion of the nanoparticles improves the switching response of the liquid crystal domains.

Monomer Functionality

RMLCM material systems in accordance with various embodiments can be formulated in a variety of ways. In many embodiments, the material system is an RMLCM that includes at least one LC, at least one multi-functional monomer, a photo-initiator, a dye, and at least one mono-functional monomer. Along with several factors, such as but not limited to recording beam power/wavelength, grating periodicity, and grating thickness, the specific mixture of components and their percent composition can determine the diffraction efficiency of the resulting HPDLC gratings. Inhomogeneous polymerization due to the spatially periodic irradiation intensity of the exposure can be the driving force to segregate monomers and LCs and to order the orientation of LC molecules, which can influence the diffraction efficiencies of the HPDLC gratings. Oftentimes, the diffusion coefficient of monomers depends on their molecular weight and reactivity. It has been shown that a variety of monomer molecular weights or functional numbers can yield a complex distribution of polymer and LC phases. In many cases, molecular functionality can be critical in achieving efficient phase separation and the formation of gratings with high diffraction efficiency. As such, many embodiments of the invention include material systems formulated with specific mixes of monomers that are chosen, at least in part, for their functionality so as to influence the diffraction efficiency and index modulation of the resulting grating structure. Other considerations in formulating such a mixture can include but are not limited to the properties of the recording beam and the thickness of the gratings. For the purposes of describing this invention, the functionality of a monomer refers to the number of reactive sites on each monomer unit.

The effects of varying monomer functionality in HPDLC material systems have been studied to some degree in the scientific literature. Such studies have generally examined the effects of the effective, or average, functionality of a mixture with regards to grating formation and performance. For example, in a paper by Pogue et al., Polymer 41 (2000) 733-741, the disclosure of which is incorporated herein by reference, investigations were conducted in floodlit PDLCs and holographic PDLC gratings to show that a decrease in effective monomer functionality general leads to decreased LC phase separation.

Many embodiments in accordance with the invention include investigations into mixtures with specific blends of monomers of low functionality that can result in the formation of gratings having high diffraction efficiency and efficient phase separation. While the scientific literature typically emphasizes the use of high functionality monomers, various embodiments in accordance with the invention are focused on the use of monomers of low functionality in certain applications. In some embodiments, the monomers within the mixture are either mono-functional monomers or bi-functional monomers. In a number of embodiments, tri-functional monomers are also included. In such mixtures, the tri-functional monomers are typically included at a low concentration, such as lower than 5 wt %.

Mixtures including low functional monomers can behave differently depending on a variety of factors, such as but not limited to the wavelength sensitivity of the material system, thickness of the HPDLC to be formed, and exposure temperature. In the scientific literature, investigations into PDLC material systems typically include UV sensitive material systems since material reaction efficiency in general is typically poor with visible light systems. However, formulations in accordance with various embodiments of the invention have been able to reach high diffraction efficiency (>80%) with low haze using low functionality monomers that are sensitive (polymerizes) to visible light. In further embodiments, the material systems include monomers that are sensitive to green light, such as light with wavelengths ranging from 495-570 nm. In addition to different light systems, performance of the HPDLC mixtures can depend on the thickness of the waveguide cell in which gratings are formed. For example, for a given material system, different thicknesses of deposited films can form waveguides with different amounts of haze. Although grating thicknesses have been explored in the patent and scientific literature, such investigations are focused on relatively thick gratings. In a number of embodiments, the material system is formulated for use in waveguides with thin form factors. In further embodiments, the material system is formulated for use in manufacturing waveguides having HPDLC layers with thicknesses of less than 10 μm. and gratings with more than 80% diffraction efficiency. In further embodiments, the material system is formulated for use in a waveguide having a 2-3 μm thick HPDLC layer and gratings with 80-90% diffraction efficiency. The material system can also be formulated for manufacturing such waveguides with low haze. In several embodiments, the material system can form HPDLC layers having less than 1% haze. Waveguide haze is the integrated effect of light interacting with material and surface inhomogeneities over many beam bounces. The impact on the ANSI contrast, the ratio of averaged white to black measurements taken from a checkerboard pattern, can be dramatic owing to the scatter contribution to the black level. Haze is mostly due to wide-angle scatter by LC droplets and other small particles or scattering centers resulting from incomplete phase separation of the LC/monomer mixture during grating recording. Haze can also arise, at least partly, from narrow angle scatter generated by large-scale nonuniformities, leading to a loss of see-through quality and reduced image sharpness. Some waveguide applications such as aircraft HUDs, which use 1-D beam expansion in thick waveguides, produce as few as 7 bounces, allowing up to 80:1 contrast. However, in thin waveguides of the type use in near eye displays the number of bounces may increase by a factor of 10 making the need for haze control more acute.

RMLCM recipes can be optimized for specific thicknesses of HPDLC layers. In many embodiments, the RMLCM recipe is optimized for a ~3 μm thick uniform modulation gratings designed to have a refractive index modulation of ~0.16. As can readily be appreciated, the specific thickness of the waveguide parts to be fabricated can vary and can depend on the specific requirements of a given application. In a number of embodiments, the waveguide parts can be fabricated with 90% transmission and 0.3% haze. In other embodiments, the waveguide parts can be fabricated with ~0.1% haze (with ~0.01% haze recorded in unexposed samples of the same material). In some embodiments, the RMLCM can be formulated for fabricating waveguide parts containing haze of less than 0.05%.

Transmission haze can be defined as the percentage of light that deviates from desired beam direction by more the 2.5 degrees on average (according to the ASTM D1003 standard). The clarity of a waveguide can be characterized by the amount of narrow angle scattered light (at an angle less than 2.5° from the normal to the waveguide surface). Transmission can be defined as the amount of light transmitted through the waveguide without being scattered. To assess general material haze, the scatter can be measured around a vector normal to a waveguide TIR surface. To assess holographic haze, the scatter can be measured around principal diffraction directions (passing through the center of the eye box). The procedures for measurement of haze, clarity and transmission are defined in the ASTM D1003

International test standards, in which "Procedure A" uses a haze meter and "Procedure B" uses a spectrophotometer. An exemplary instrument for measuring haze is the BYK-Gardner HAZE Guard II equipment.

In many embodiments, the RMLCM mixture includes a liquid crystal mixture, a complex mixture of acrylates and acrylate esters, Dynasylan@ MEMO, and photoinitiators. In further embodiments, the RMLCM includes EHA and DFHA. Depending on the specific mix of components and their percent composition, the resulting grating can have vastly different characteristics. In some embodiments, the proportion of LC by weight is greater than 30%. In further embodiments, the proportion of LC is greater than 35 wt %. In some embodiments, the mixture includes liquid crystal with high birefringence. In further embodiments, the high birefringence liquid crystal accounts for more than 20 wt % of the mixture. In a number of embodiments, dye and photo-initiators account for less than 5 wt % of the mixture.

Nematic LC materials can provide a range of birefringence (which can translate to refractive index modulation). Low to medium birefringence typically covers the range of 0.09-0.12. However, gratings can be designed using much lower birefringence values, including gratings in which the birefringence varies along the grating. Such gratings can be used to extract light from waveguides with low efficiency at one end of the grating and high efficiency at the other end of the grating to provide spatially uniform output illumination. High birefringence (nematic LC) is typically the range of 0.2-0.5. Even higher values are possible. Nematic liquid crystals, compounds, and mixtures with positive dielectric anisotropies (i.e., LCs for which the dielectric constant is greater in the long molecular axis than that in the other directions) are review in a paper by R. Dabrowski et al., "High Birefringence Liquid Crystals"; Crystals; 2013;3; 443-482, the disclosure of which is incorporated herein by reference.

The functionality of the monomers in the mixtures can greatly influence the diffraction efficiency of the resulting grating. In many embodiments, the mixture includes at least one mono-functional monomer and at least one multifunctional monomer in varying concentrations. In several embodiments, the concentration of mono-functional monomer within the mixture ranges from 1-50 wt %. The mono-functional monomer can include aliphatic/aromatic groups and an adhesion promoter. In some embodiments, the proportion of multi-functional monomers present in the mixture is in the range of 2-30 wt %. Multi-functional monomers in accordance with various embodiments of the invention typically include monomers of low functionality. In a number of embodiments, the mixture includes a bi-functional monomer at a low concentration. In further embodiments, the mixture includes bi-functional monomers at less than 15 wt %. Depending on the type and concentration of bi-functional monomer in the mixture, adequate phase separation and grating formation can occur. In the illustrative embodiment, the mono-functional monomer, bi-functional monomer and LC have relative weight ratios of 30%, 14%, and 40%, which resulted in a formulation that allowed for the recording of gratings with a diffraction efficiency higher than 90% and an index modulation of around 0.12.

As can readily be appreciated, percent composition of each component within an RMLCM can vary widely. Formulations of such material systems can be designed to achieve certain characteristics in the resulting gratings. In many cases, the RMLCM is formulated to have as high a diffraction efficiency as possible.

Workcell Cluster for Manufacturing Waveguide Cells

Figure 2A:
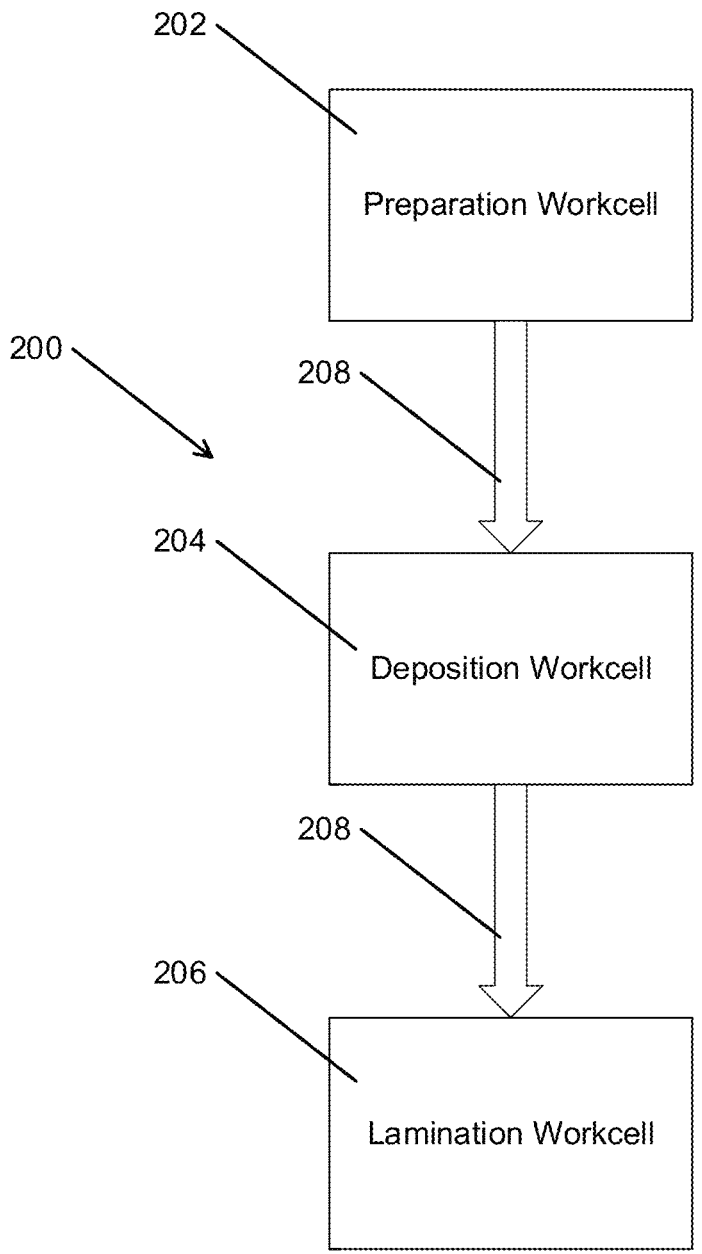
FIG. 2A conceptually illustrates a workcell cluster system in accordance with an embodiment of the invention.

Waveguide cell manufacturing systems in accordance with various embodiments of the invention can be implemented as workcell clusters. By compartmentalizing different manufacturing steps into workcells, modular systems can be implemented. In many embodiments, a workcell cluster includes a preparation workcell for preparing substrates for material deposition, a deposition workcell for depositing an optical recording material onto a substrate, and a lamination workcell for laminating various layers together to construct a waveguide cell. Workcells can be configured in various ways to implement different manufacturing processes for waveguide cells. In some embodiments, the workcells are linked and configured such that the output of one workcell is transferred to another workcell, forming a manufacturing assembly line. The transferring mechanism can be implemented in a variety of ways, such as but not limited to the use of mechanical arms, suction, and/or a conveyor system. In several embodiments, the products are manually transferred. FIG. 2A conceptually illustrates a workcell cluster system 200 in accordance with an embodiment of the invention. In the illustrative embodiment, the system 200 includes a preparation workcell 202, a deposition workcell 204, and a lamination workcell 206. As shown, arrows 208 indicate a sequential workflow relationship among the workcells.

Figure 2B:
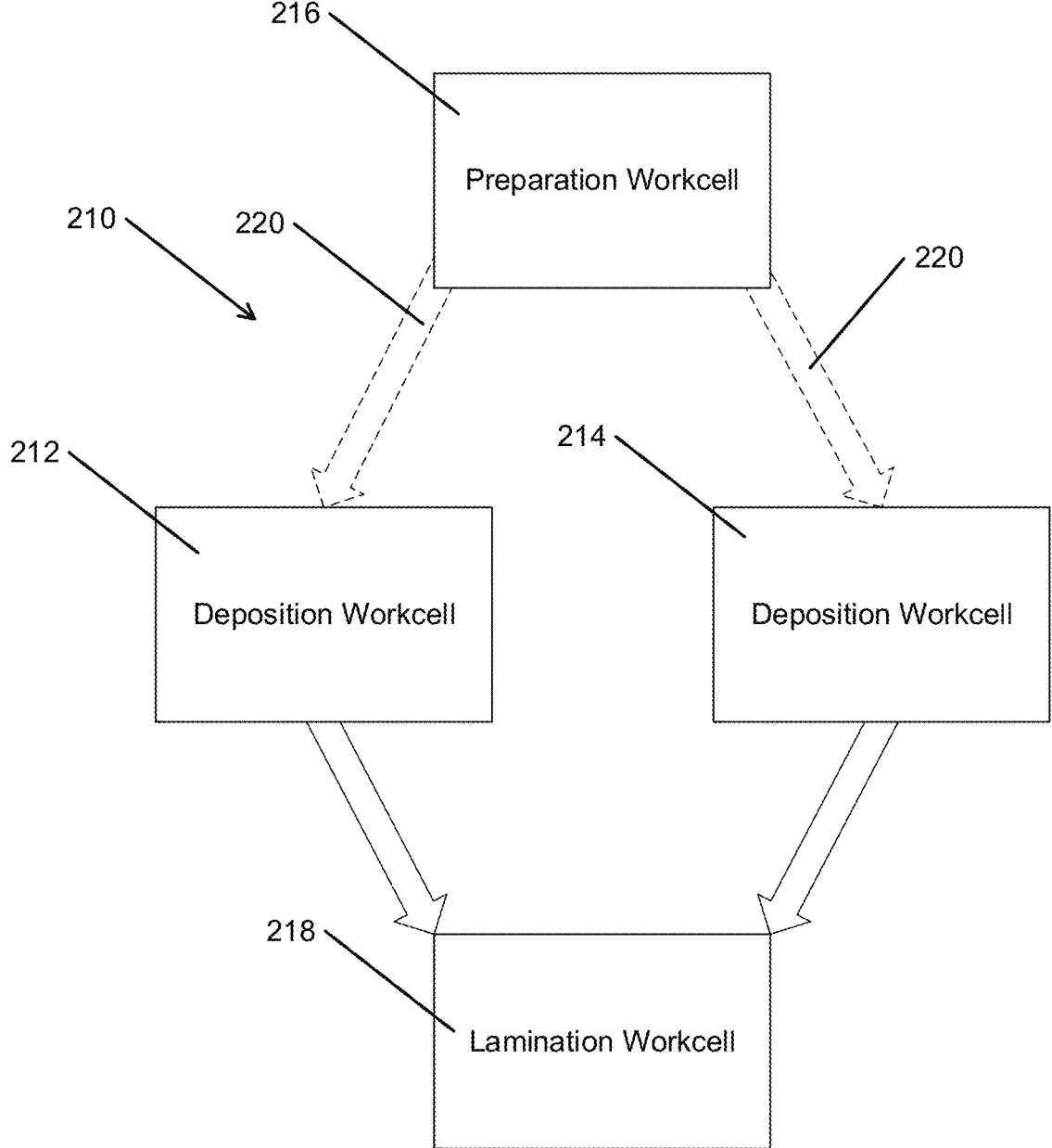
FIG. 2B conceptually illustrates a workcell cluster system with two deposition workcells in accordance with an embodiment of the invention.

One advantage in a modular system is the ability to vary the number of workcells dedicated to a particular task to improve throughput by optimizing workcell use and reducing workcell downtime. For example, a waveguide cell manufactured with different optical recording materials may result in different deposition times. In such embodiments, the number of deposition workcells can vary accordingly to balance out the task completion time of each workcell such as to minimize the overall downtime of the workcells. FIG. 2B conceptually illustrates a workcell cluster system 210 with two deposition workcells 212, 214 in accordance with an embodiment of the invention. In the illustrative embodiment, the system 210 includes a preparation workcell 216, two deposition workcells 212, 214, and a lamination workcell 218. Dotted arrows 220 indicate that output from the preparation workcell 216 can be received by either deposition workcell 212, 214. Such a system can be ideally implemented when the completion time for a single deposition process is approximately twice as long as the completion time for other processes.

Although FIGS. 2A and 2B conceptually illustrate specific workcell cluster system configurations, workcell clusters in accordance with various embodiments of the invention can be configured in numerous ways depending on the specific requirements of the given application. For example, workcell clusters can be configured to have different workflow paths, types of workcells, and/or numbers of workcells.

Due to the sensitive nature of some materials and processes associated with waveguide cell fabrication, workcells can be configured to provide protection from environmental light and contaminants. In many embodiments, optical filters cover the workcell in order to reduce and/or prevent unwanted light from interacting with the optical recording material, which is typically a photosensitive material. Depending on the specific type of optical recording material, the deposition workcell can be lined with an appropriate optical filter that prevent light of certain wavelengths from entering the workcell and exposing the optical recording material. In addition to the reduction/prevention of light contamination, workcells can also be configured to reduce particulate contamination. In several embodiments, the workcell is configured to operate in an environment with minimal air contamination. A low-particulate environment can be achieved in many different ways, including but not limited to the use of air filters. In a number of embodiments, air filters employing laminar airflow principles are implemented. Contamination reduction/prevention systems such as those described above can be implemented separately or in combination. Although specific systems are described, workcells in accordance with various embodiments of the invention can be constructed in various ways as to alter the working environment in a desired manner. For example, in several embodiments, the workcell is configured to operate in a vacuum. Specific workcells and their implementations and constructions are described in the sections below in further detail.

Preparation Workcell

Waveguide cells in accordance with various embodiments of the invention are typically composed of a layer of optical recording material sandwiched between two substrates. Manufacturing techniques for constructing such waveguide cells in accordance with various embodiments of the invention can include a deposition step where a layer of optical recording material is deposited onto one of the substrate. In many embodiments, a preparation workcell can be implemented to perform a cleaning/preparation procedure on the substrates to prepare them for the deposition step. Preparing substrates, such as but not limited to glass plates, can include ridding the surfaces of contaminants and increasing the surface adhesion properties for better material deposition.

Preparation workcells can be configured to implement various cleaning and preparation protocols. Mechanical arms and/or suction apparatuses can be used to maneuver the substrates throughout the workcell. In many embodiments, the preparation workcells are configured to clean glass substrates using various solvents and solutions, including but not limited to soap solutions, acid washes, acetone, and various types of alcohols. In some embodiments, several types of solvents and/or solutions are used in conjunction. For example, in several embodiments, methanol or isopropanol can be administered after acetone to rinse off excess acetone. In a number of embodiments, deionized water is used to rinse off excess solvents or solutions. The solvents can be administered in several ways, including but not limited to the use of nozzles and baths. After cleaning, the workcell can be configured to dry the substrates using an inert gas, such as nitrogen, and/or a heating element.

In many embodiments, the cleaning process includes a sonication step. In several embodiments, the substrate is placed in a chamber containing a solution and a transducer is used to produce ultrasonic waves. The ultrasonic waves can agitate the solution and remove contaminants adhered to the substrates. The treatment can vary in duration depending on several factors and can be performed with different types of substrates. Deionized water or cleaning solutions/solvents can be used depending on the type of contamination and the type of substrate.

In many embodiments, the preparation workcell is configured to implement a plasma chamber to plasma treat the surfaces of the substrates. In some embodiments, the substrates are made of glass. Existing in the form of ions and electrons, plasma is essentially an ionized gas that has been electrified with extra electrons in both negative and positive states. Plasma can be used to treat the surface of the substrate to remove contaminants and/or prepare the surface for material deposition by increasing the surface energy to improve adhesion properties. In a number of embodiments, the workcell includes a vacuum pump, which can be used to create a vacuum under which the plasma treatment can be performed.

As can readily be appreciated, preparation workcells in accordance with various embodiments of the invention can be configured to perform combinations of various steps to implement a specific cleaning protocol according to the requirements of a given application. Although specific preparation workcells for preparing glass plates are discussed above, preparation workcells can be implemented to preform various preparatory steps for a variety of different substrates, including but not limited to plastics.

Deposition Workcell

Waveguide cell manufacturing systems can utilize various techniques for placing optical recording materials in between two substrates. Manufacturing systems in accordance with various embodiments of the invention can utilize a deposition process where a film of optical recording material is deposited onto a substrate, and the composite is laminated along with a second substrate to form a three-layer laminate. In many embodiments, the manufacturing system is a workcell cluster that includes a deposition workcell for depositing a film of optical recording material onto a substrate. Such deposition workcells can be configured to receive substrates from preparation workcells. In some embodiments, the deposition workcell includes a stage for supporting the substrate and at least one deposition mechanism for depositing material onto the substrate. Any of a variety of deposition heads can be implemented to perform as the deposition mechanism. In several embodiments, spraying mechanisms such as but not limited to spraying nozzles are implemented to deposit optical recording material onto a substrate. In some embodiments, the optical recording material is deposited using a printing mechanism. Depending on the type of deposition mechanism/head implemented, several different deposition capabilities can be achieved. In a number of embodiments, the deposition head can allow for the deposition of different materials and/or mixtures that vary in component concentrations. As can readily be appreciated, the specific deposition mechanism utilized can depend on the specific requirements of a given application.

The components within the deposition workcell can be configured to move in various ways in order to deposit the optical recording material onto the substrate. In many embodiments, the deposition head and/or the stage are configured to move across certain axes in order to deposit one or multiple layers of optical recording material. In some embodiments, the deposition head is configured to move and deposit material across three dimensions, such as in a three-dimensional Euclidean space, which allows for the deposition of multiple layers onto the substrate. In a number of embodiments, the deposition head is only configured to move in two axes to deposit a single layer. In other embodiments, the stage and, consequently, the substrate are configured to move in three dimensions while the deposition head is stationary. As can readily be appreciated, deposition applications can be implemented to deposit material in various dimensions by configuring the degrees of motion freedom of the print head(s) and/or stage. The stage and deposition head can be configured such that their combination of degrees of motion freedom allows for depositing material in n-dimensional Euclidean space, where n is the desired dimension. For example, in several embodiments, the deposition head is configured to move back and forth to deposit material in one axis while the stage moves in a different axis, allowing for the deposition of material in a two-dimensional Euclidean plane. In a number of embodiments, the stage is implemented using a conveyor belt. The system can be designed such that the conveyor belt receives the substrate from a different workcell, such as the preparation workcell. Once received, the conveyor system can move the substrate along as a deposition head deposits a layer of material onto the substrate. At the end of the conveyor path, the substrate can be delivered into another workcell.

Figures 3A, 3B:
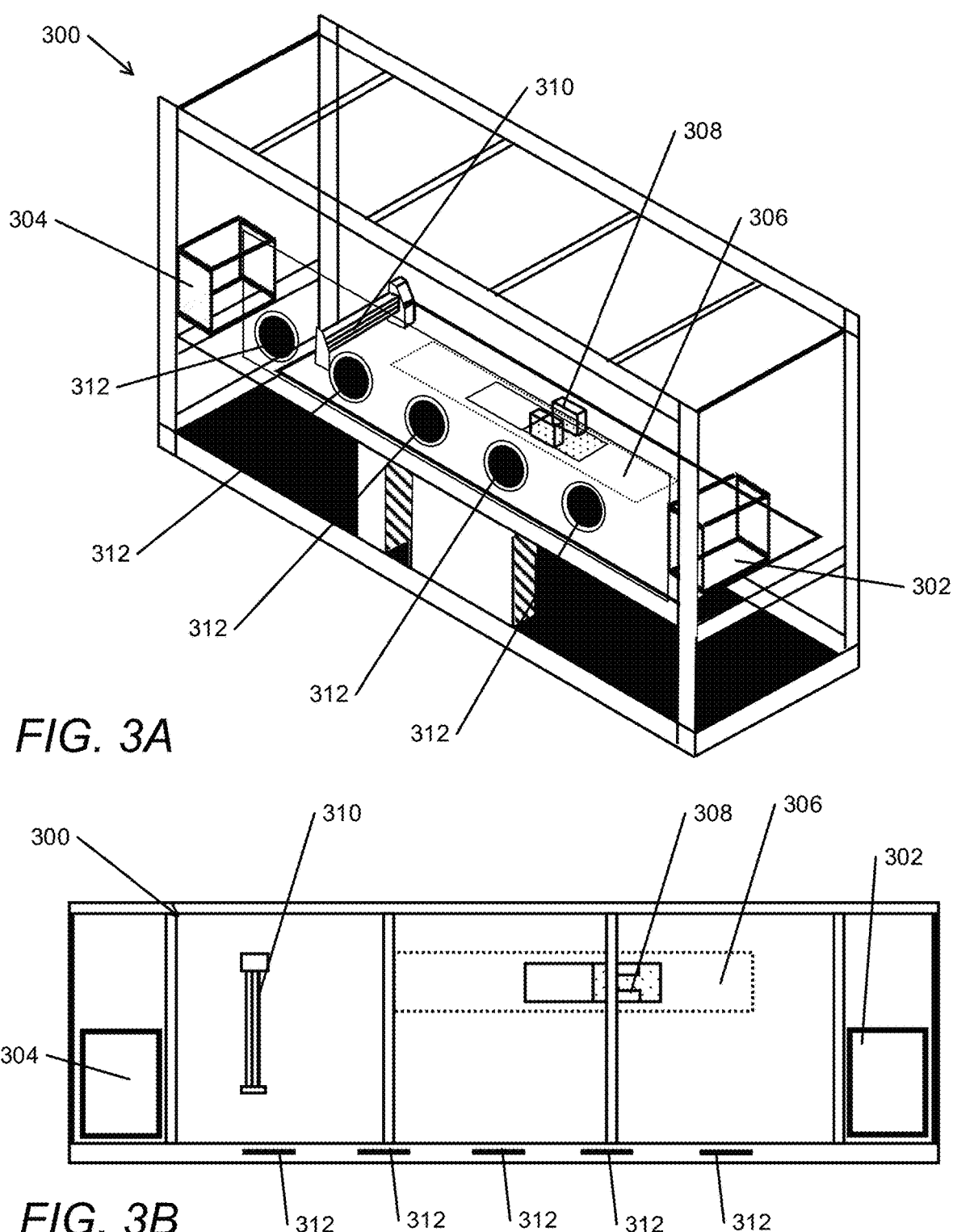
FIG. 3A conceptually illustrates an isometric view of a deposition workcell in accordance with an embodiment of the invention.
FIG. 3B conceptually illustrates a top view of a deposition workcell in accordance with an embodiment of the invention.

In a number of embodiments, the deposition workcell includes an inkjet print head configured to deposit optical recording material onto the substrate. Conventionally, inkjet printing refers to a printing method that deposits a matrix of ink dots to form a desired image. In typical operation, an inkjet print head contains a large amount of small individual nozzles that can each deposit a dot of material. In additive manufacturing applications, inkjet printing can be used to create complex patterns and structures with high precision due to the size and number of nozzles in a typical inkjet print head. Applying these principles to waveguide cell manufacturing applications, inkjet printing can be used to print a uniform or near-uniform, in terms of thickness and composition, layer of optical recording material. Depending on the application and inkjet print head, one or multiple layers of the optical recording material can be printed onto the substrate. Various optical recording materials, such as those described in the sections above, can be used in conjunction with an inkjet print head. In addition to the capability of printing in different materials, the printing system can be configured for use with various types of substrates. As can readily be appreciated, the choice of material to be printed and the substrates used can depend on the specific requirements of a given application. For instance, choices in material systems can be selected based on printing stability and accuracy. Other considerations can include but are not limited to viscosity, surface tension, and density, which can influence several factors such as but not limited to droplet formability and the ability to form layers of uniform thickness, A deposition workcell 300 in accordance with an embodiment of the invention is conceptually illustrate in FIGS. 3A and 3B. FIG. 3A shows an isometric view of the deposition workcell 300 while FIG. 3B shows a top view of the same deposition workcell 300. As shown, the deposition workcell 300 is constructed with a frame that can hold optical glass filters to prevent particulate contamination and environmental light from exposing optical recording materials within the workcell 300. The workcell includes chambers 302, 304 for receiving substrates and outputting waveguide cells. In the illustrative embodiment, the stage is implemented as a conveyor belt 306 that moves received substrates along one direction. The deposition workcell 300 further includes an inkjet printer 308 implemented as a deposition mechanism. The inkjet printer 308 is configured to print across a direction different from the movement of the conveyor belt 306, allowing for the deposition of a layer of optical recording material across the planar surface of the substrates. Additionally, the deposition workcell 300 implements a roller laminator 310 for laminating the printed layer and two substrates to construct a waveguide cell. The workcell 300 is also implemented as a glovebox with gloves 312 that allow for the manual manipulation of the devices within the workcell 300 while maintaining a clean environment.

Although FIGS. 3A and 3B depict a specific deposition workcell configuration, deposition workcells can be configured in many ways in accordance with various embodiments of the invention. For example, the laminator can be implemented in a separate lamination workcell. In several embodiments, automatic system configurations can be implemented. In many embodiments, multiple inkjet print heads are used. In other embodiments, spraying nozzles are used as the deposition mechanism.

Modulation of Material Composition

High luminance and excellent color fidelity are important factors in AR waveguide displays. In each case, high uniformity across the FOV can be essential. However, the fundamental optics of waveguides can lead to non-uniformities due to gaps or overlaps of beams bouncing down the waveguide. Further non-uniformities may arise from imperfections in the gratings and non-planarity of the waveguide substrates. In SBGs, there can exist a further issue of polarization rotation by birefringent gratings. The biggest challenge is the fold grating where there are millions of light paths resulting from multiple intersections of the beam with the grating fringes. Careful management of grating properties, particularly the refractive index modulation, can be utilized to overcome non-uniformity in accordance with various embodiments of the invention.

Out of the multitude of possible beam interactions (diffraction or zero order transmission), only a subset contributes to the signal presented at the eye box. By reverse tracing from the eyebox, fold regions contributing to a given field point can be pinpointed. The precise correction to the modulation that is needed to send more into the dark regions of the output illumination can then be calculated. Having brought the output illumination uniformity for one color back on target, the procedure can be repeated for other colors. Once the index modulation pattern has been established, the design can be exported to the deposition mechanism, with each target index modulation translating to a unique deposition setting for each spatial resolution cell on the substrate to be coated. In many embodiments, the spatial pattern can be implemented to 30 micrometers resolution with full repeatability.

Figure 4A:
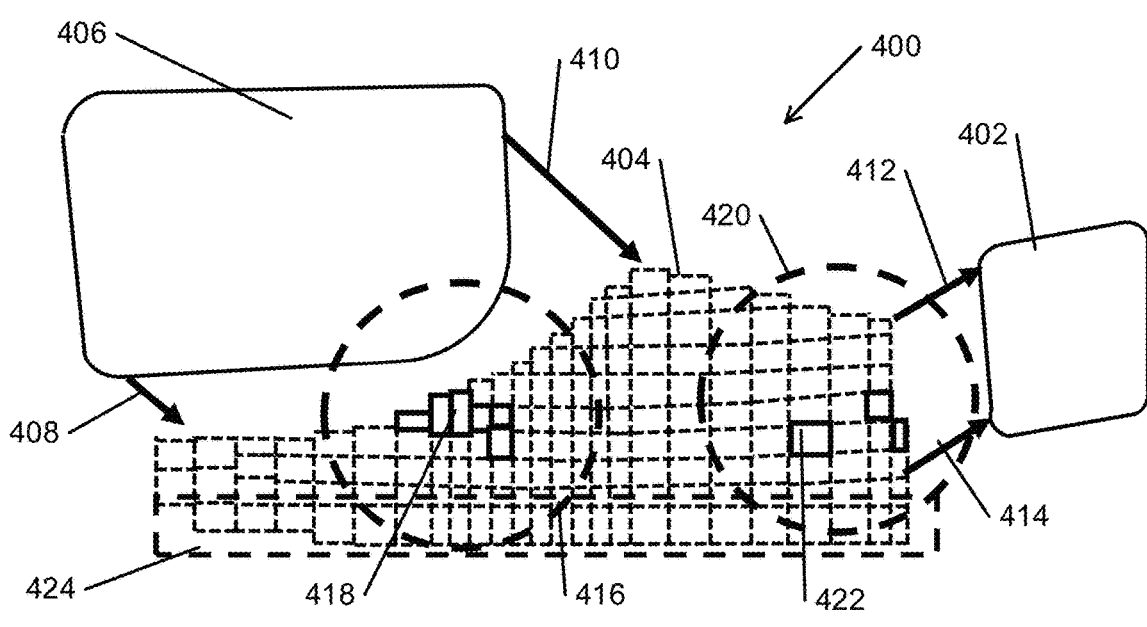
FIGS. 4A and 4B conceptually illustrate schematically the use of reverse ray tracing to compute a compensated index modulation pattern for coating in accordance with various embodiments of the invention.
Figure 4B:
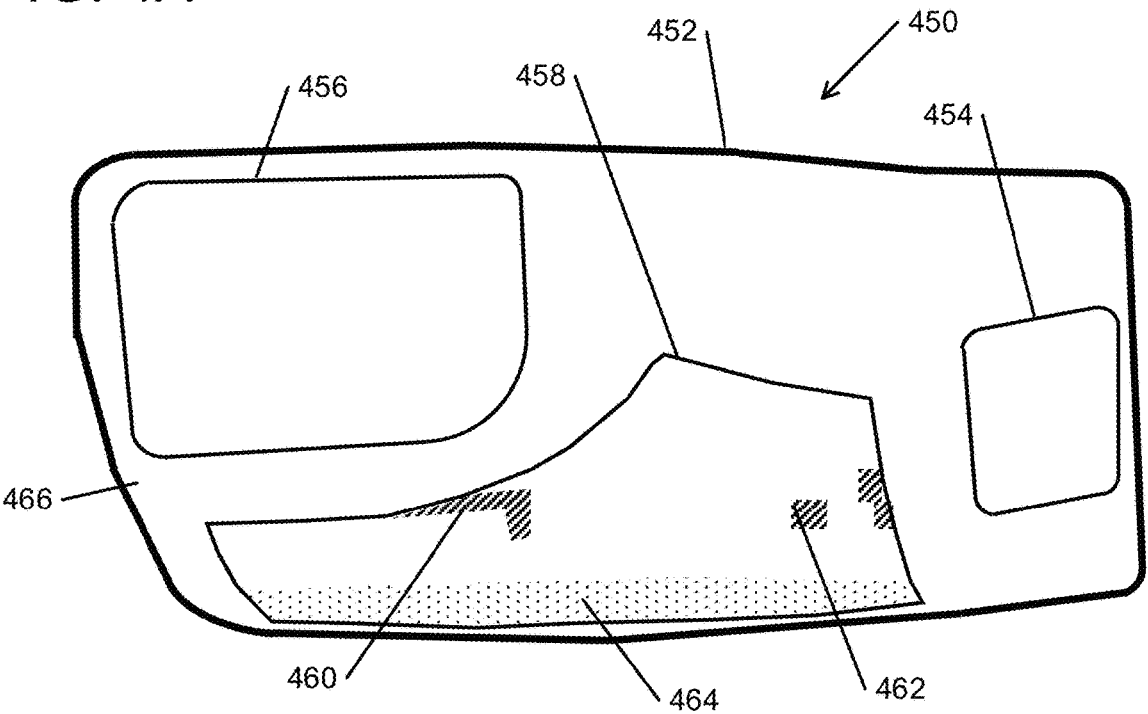

FIGS. 4A and 4B conceptually illustrate schematically the use of reverse ray tracing to compute a compensated index modulation pattern for coating in accordance with various embodiments of the invention. The procedure can determine the optimum usable area of the fold grating and the refractive index modulation variation across the fold grating needed to provide uniform illumination at the eye box. FIG. 4A shows a mathematical model of a basic waveguide architecture that includes an input grating 402, a fold grating that is divided up into a calculation mesh 404, and an output grating 406. By tracing rays from points across the eye box through the output grating and through the fold grating, the fold grating cells which contribute to the eyebox illumination for a given FOV direction can be identified. Reverse beam paths from the output grating are indicated by the rays 408-414. By repeating the ray trace for different FOV angles the maximum extent of the fold grating needed to fill the eye box can be determined. This ensures that the area of HPDLC material to be deposited/printed can be kept to a minimum, thereby reducing haze in the finished waveguide part. The procedure can also identify which cells need to have their index modulation increased (or decreased) in order to maintain illumination uniformity across the eyebox. For example, in the embodiment of FIG. 4A, most of the fold grating region has a refractive index modulation of 0.03. However, certain calculation cells encircled by 416 (such as cell 418, for example) and encircled by 420 (such as cell 422, for example) should have index modulations of 0.07, while the calculation cells lying within the rectangular zone 424 should have index modulation 0.05. Typically, the map of index modulation values is exported as an AutoCAD DXF (Drawing Interchange Format) file into the processor controlling the deposition mechanism. FIG. 4B is a plan view 450 of the final waveguide part 452 onto which is superimposed the index modulation map of the printed grating layer (corresponding to the model of FIG. 4A) as would be revealed by examining the printed grating under cross polarizers. The grating regions include the input 454, output 456, and fold 458 gratings. In the illustrative embodiment, the fold grating contains the high index modulation regions 460, 462, and 464 corresponding to the cells identified in regions 416, 420, and 424 of FIG. 4A. The grating regions of FIG. 4B are surrounded by a clear polymer region 466. Although FIGS. 4A and 4B illustrate a specific way of computing a compensated index modulation pattern, any of a variety of techniques can be utilized to compute such a pattern.

Figure 5A:
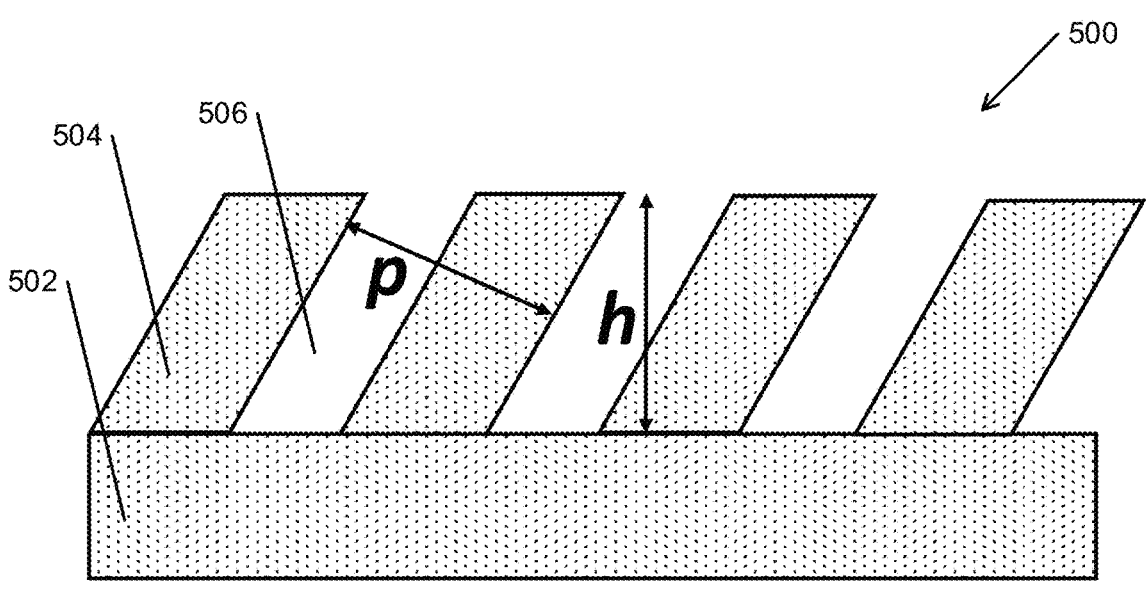
FIGS. 5A and 5B conceptually illustrate the fundamental structural differences between SBGs and SRGs.
Figure 5B:
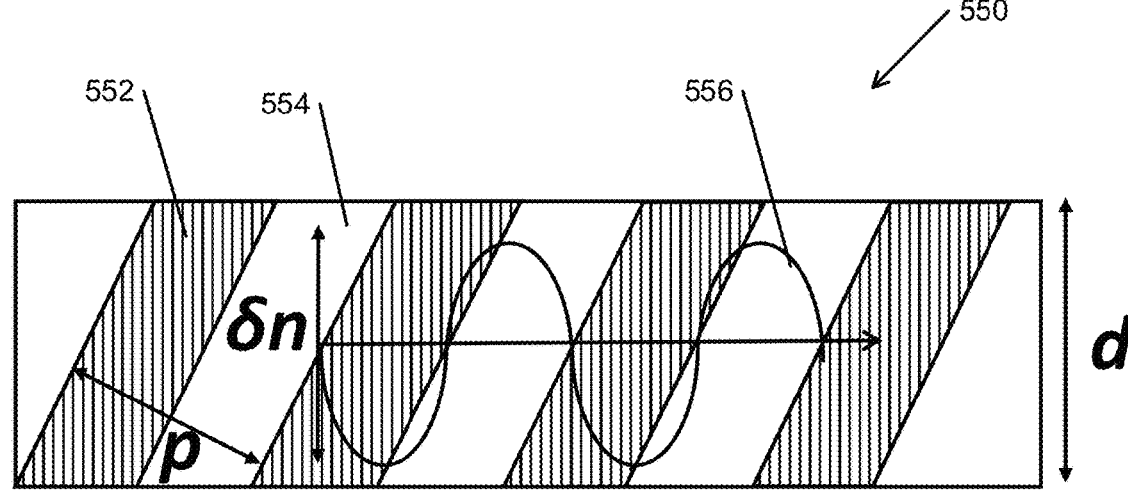

Compared with waveguides utilizing surface relief gratings ("SRGs"), SBG waveguides implementing manufacturing techniques in accordance with various embodiments of the invention can allow for the grating design parameters that impact efficiency and uniformity, such as refractive index modulation and grating thickness, to be adjusted dynamically during the deposition process. As such, there is no need for a new master for the grating recording process. With SRGs where modulation is controlled by etch depth, such schemes would not be practical as each variation of the grating would entail repeating the complex and expensive tooling process. Additionally, achieving the required etch depth precision and resist imaging complexity can be very difficult. FIGS. 5A and 5B conceptually illustrate the fundamental structural differences between SBGs and SRGs. FIG. 5A shows a cross-sectional view 500 of a portion of an SRG. In the illustrative embodiment, the grating includes a substrate 502 supporting slanted surface relief elements 504 separated by air gaps 506. Typically, the surface relief elements and substrate are formed from a common material. The grating pitch is indicated by the symbol p and the grating depth by symbol h. FIG. 5B shows a cross-sectional view 550 of an SBG. In contrast to an SRG, the SBG includes alternating slanted Bragg fringes formed from low index monomer-rich fringes such as 552 and higher index LC-rich fringes such as 554. The index difference is characterized by the refractive index modulation on, which plays an equivalent role in determining grating diffraction efficiency to the grating depth in a SRG. The variation of index modulation is represented by the superimposed plot 556 of index modulation versus distance z along the grating. In some embodiments, the index modulation has a sinusoidal profile as shown in FIG. 5B. In embodiments in which the SBG is formed in a uniform modulation HPLDC, the index modulation profile can include near-rectangular LC-rich and polymer-rich regions.

Deposition processes in accordance with various embodiments of the invention can provide for the adjustment of grating design parameters by controlling the type of material that is to be deposited. Similar to multi-material additive manufacturing techniques, various embodiments of the invention can be configured to deposit different materials, or different material compositions, in different areas on the substrate. In many embodiments, a layer of optical recording material can be deposited with different materials in different areas. For example, deposition processes can be configured to deposit HPDLC material onto an area of a substrate that is meant to be a grating region and to deposit monomer onto an area of the substrate that is meant to be a nongrating region. In several embodiments, the deposition process is configured to deposit a layer of optical recording material that varies spatially in component composition, allowing for the modulation of various aspects of the deposited material. Modulation schemes and deposition processes for different types of materials and mixtures are discussed below in further detail.

Figure 6:
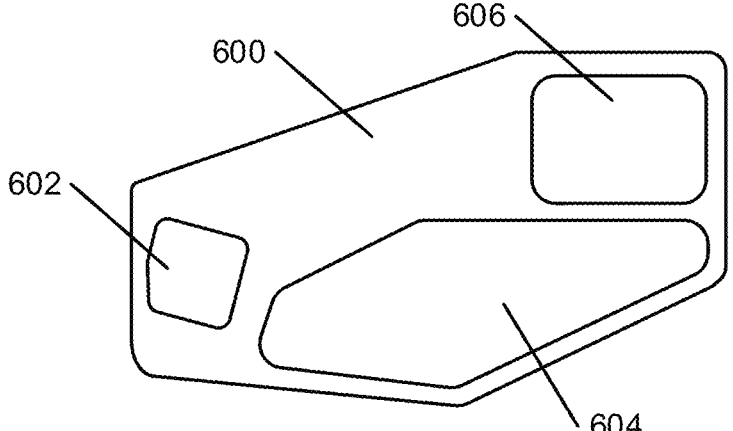
FIG. 6 conceptually illustrates a waveguide cell with marked areas for gratings in accordance with an embodiment of the invention.

The choice in material printed in a specific area can depend on the optical element that will later be recorded in that area. For example, in some embodiments, the deposition head is configured to deposit a layer of optical recording material for a waveguide cell intended to be recorded with three different gratings. The layer can be deposited such that the materials printed in each of the areas designated for the three gratings are all different from one another. FIG. 6 conceptually illustrates a waveguide cell 600 with marked areas intended to be recorded with various gratings in accordance with an embodiment of the invention. As shown, areas for an input grating 602, a fold grating 604, and an output grating 606 are outlined. Such areas can each be composed of a different material or different mixture composition depending on the given application. In a number of embodiments, different materials can be deposited to produce different diffraction efficiencies among the recorded gratings. In the illustrative embodiment, the waveguide cell is in a curvilinear shape, which, along with the positions, sizes, and shapes of the gratings, is designed to be a waveguide for near-eye applications.

Deposition of material with different compositions can be implemented in several different ways. In many embodiments, more than one deposition head can be utilized to deposit different materials and mixtures. Each deposition head can be coupled to a different material/mixture reservoir. Such implementations can be used for a variety of applications. For example, different materials can be deposited for grating and nongrating areas of a waveguide cell. In some embodiments, HPDLC material is deposited onto the grating regions while only monomer is deposited onto the nongrating regions. In several embodiments, the deposition mechanism can be configured to deposit mixtures with different component compositions.

Figure 7A:
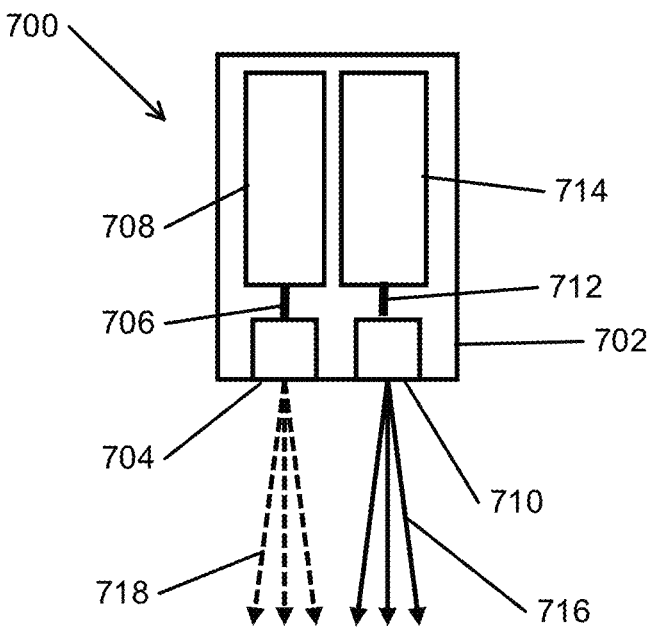
FIGS. 7A and 7B conceptually illustrate operation of a deposition mechanism utilizing a spray module in accordance with an embodiment of the invention.
Figure 7B:
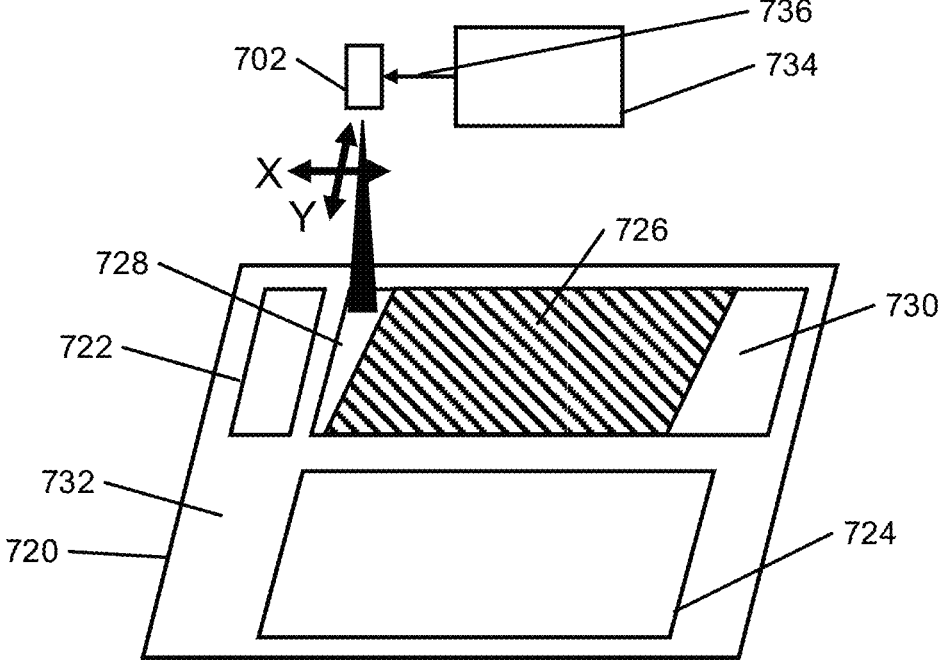

In some embodiments, spraying nozzles can be implemented to deposit multiple types of materials onto a single substrate. In waveguide applications, the spraying nozzles can be used to deposit different materials for grating and non-grating areas of the waveguide. FIGS. 7A and 7B conceptually illustrate operation of a deposition mechanism utilizing a spray module in accordance with an embodiment of the invention. As shown, the apparatus 700 includes a coating module 702 that includes a first spray module 704 connected via a pipe 706 to a first reservoir 708 containing a first mixture of a first material and a second spray module 710 connected via a pipe 712 to a second reservoir 714 containing a second mixture of a second material. In the illustrative embodiment, the first material includes at least a liquid crystal and a monomer while the second material includes only a monomer. Such a configuration allows for the deposition of a layer of optical recording material with defined grating and non-grating areas. As can readily be appreciated, any configurations of different mixtures can be utilized as appropriate depending on the specific application.

In FIGS. 7A and 7B, the first and second spray modules provide jets of liquid droplets over a controllable divergence angle as represented by 716, 718. The apparatus further includes a support for a transparent substrate 720 having predefined regions for supporting gratings as illustrated by the shaded regions 722-726, regions of gratings that do not transmit light into the eyebox as indicated by 728, 730, and regions surrounding the gratings indicated by 732. In some embodiments, the regions 728, 730 are identified by a reverse ray trace of the waveguide from the eyebox. During operation, the regions for supporting gratings providing diffracted light that enters the eye box are coated with the first mixture. The regions 728, 730 are coated with the second mixture. The apparatus further includes a positioning apparatus 734 connected to the coating apparatus by a control link 736 for traversing the coating apparatus across the substrate. The apparatus further includes a switching mechanism for activating the first spray module and deactivating the second spray module when the coating apparatus is positioned over a substrate region for supporting a grating and for deactivating the first spray module and activating the second spray module when the coating apparatus is positioned over a substrate region that does not support a grating.

Figure 8A:
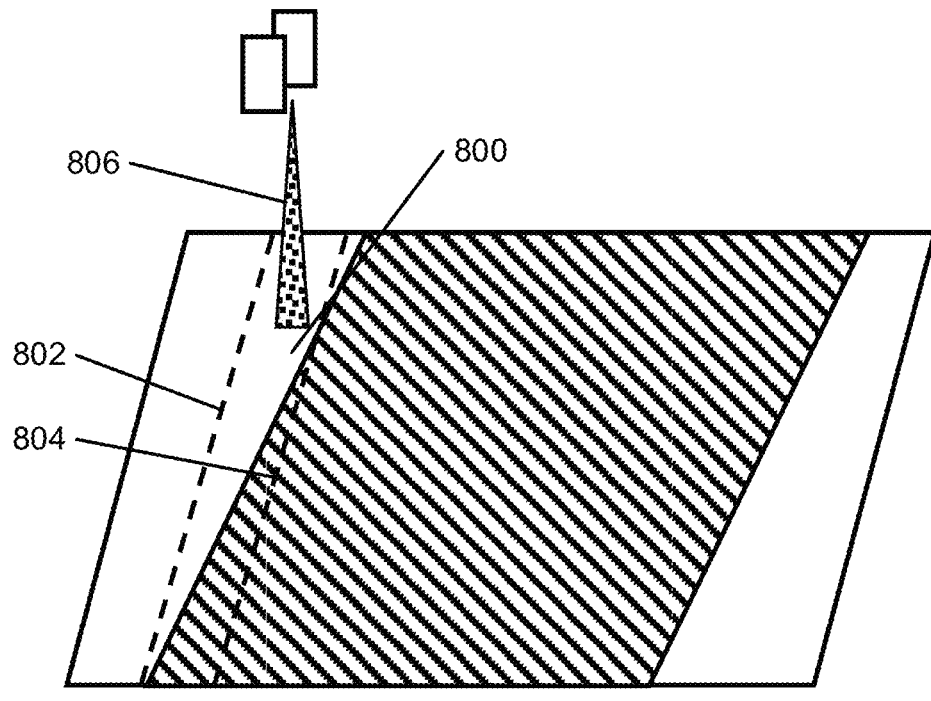
FIGS. 8A and 8B conceptually illustrate two operational states of a spray module in accordance with an embodiment of the invention.
Figure 8B:
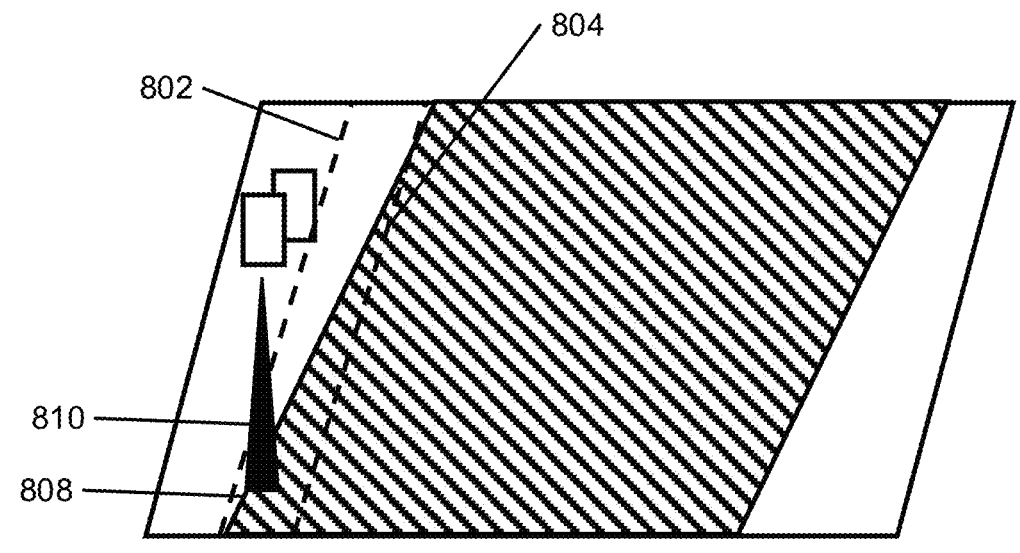

Two operational states of the apparatus are conceptually illustrated in FIGS. 8A and 8B, which show a detail of the substrate. As shown in FIG. 8A, when the coating apparatus is over a nongrating-supporting region 800 (located in the upper region of the strip bounded by the edges 802, 804), the second spray module is activated, and the first spray module is deactivated so that a layer of monomer 806 is sprayed onto the substrate. As shown in FIG. 8B, when the coating apparatus is over a substantially grating-supporting region 808 (located in the lower region of the strip bounded by the edges 802, 804), the second spray module is deactivated, and the first spray module is activated so that a layer of liquid crystal and monomer mixture 810 is sprayed onto the substrate.

Although FIGS. 7A-8B illustrate specific applications and configurations of spraying mechanisms, spraying mechanisms and deposition mechanisms in general can be configured and utilized for a variety of applications. In many embodiments, the spraying mechanism is configured for printing gratings in which at least one of the material composition, birefringence, and thickness can be controlled using a coating apparatus having at least two selectable spray heads. In some embodiments, the deposition workcell provides an apparatus for depositing grating recording material optimized for the control of laser banding. In several embodiments, the deposition workcell provides an apparatus for depositing grating recording material optimized for the control of polarization non-uniformity. In some embodiments, the deposition workcell provides an apparatus for depositing grating recording material optimized for the control of polarization non-uniformity in association with an alignment control layer. In a number of embodiments, the deposition workcell can be configured for the deposition of additional layers such as beam splitting coatings and environmental protection layers. Additionally, although FIGS. 7A-8B discuss the capabilities of spraying nozzles, these capabilities can be implemented in other deposition mechanisms. For example, inkjet print heads can also be implemented to print different materials in grating and nongrating regions of the substrate.

Figure 9:
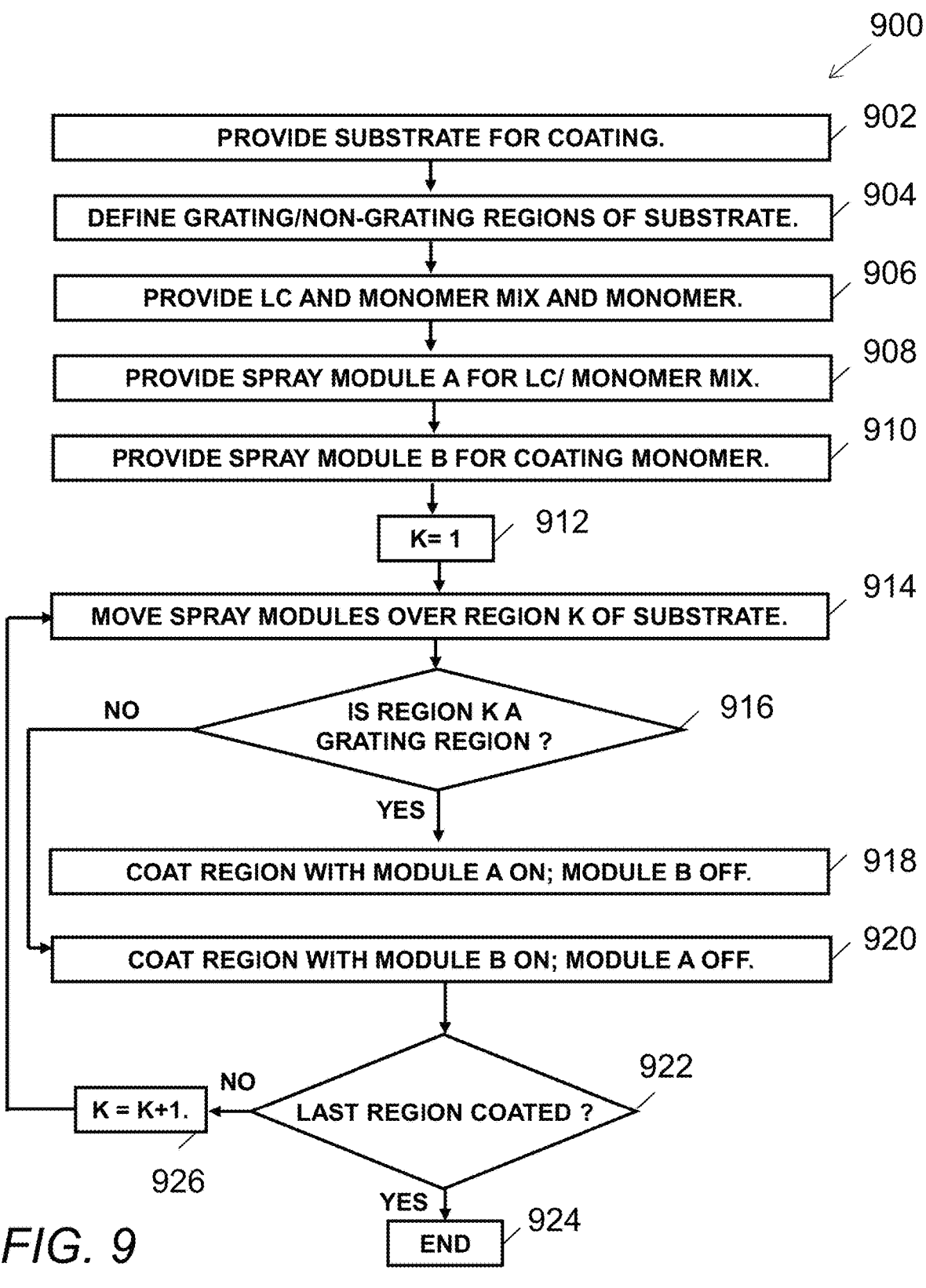
FIG. 9 is a flow chart conceptually illustrating a method of fabricating a holographic grating using a selective coating process in accordance with an embodiment of the invention.

FIG. 9 is a flow chart conceptually illustrating a method of fabricating a holographic grating using a selective coating process in accordance with an embodiment of the invention. Referring to FIG. 9, the method 900 includes providing (902) a transparent substrate for coating. A grating supporting and non-grating-supporting regions of the substrate can be defined (904). Depending on the specific application, gratings of various sizes and shapes can be defined. In some embodiments, a grating region supports an input, a fold, or an output grating. In many embodiments, the substrate has regions defined for gratings made of a combination of the aforementioned types of gratings. A first mixture for coating containing a liquid crystal and monomer and a second mixture for coating containing a monomer can be provided (906). A first spray head can be provided (908) for coating the first mixture onto the substrate. A second spray head can be provided (910) for coating the second mixture. The first and second spray heads integrated together can be considered a coating apparatus. The coating apparatus can be set (912) to its starting position (k=1). The coating apparatus can be moved (914) to the current position over the substrate. A decision can be made (916) on whether the current coating apparatus is positioned over a grating supporting region or a non-grating-supporting region. If the coating apparatus is over a grating region, the first spray head can be activated and the second spray head can be deactivated (918). If the coating module is over a grating-supporting region, the first spray head can be deactivated and the second spray head can be activated (920). A decision can be made (922) regarding the coating status. If all specified regions have been coated, the process can be terminated (924). If the specified regions have not all been coated, the next region (increment k) to be coated can be selected (926) and the deposition steps can be repeated.

Figure 10:
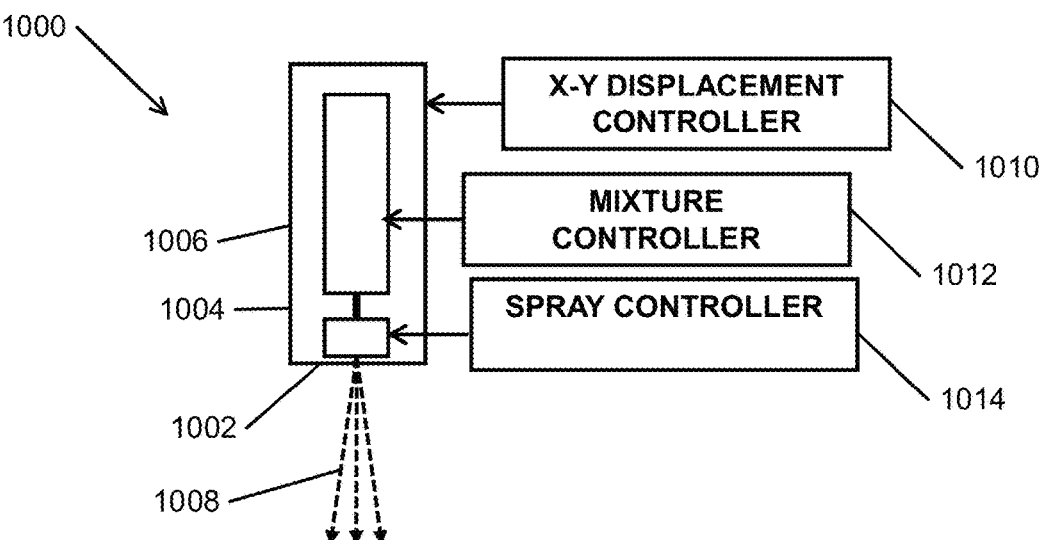
FIG. 10 conceptually illustrates a deposition head for providing predefined grating characteristics within grating regions in accordance with an embodiment of the invention.

Although FIG. 9 illustrates a specific method for depositing different materials over a substrate, the deposition mechanism can be configured to produce a film of material having characteristics that can vary spatially and across regions. FIG. 10 conceptually illustrates a deposition head for providing predefined grating characteristics within grating regions in accordance with an embodiment of the invention. Referring to FIG. 10, the deposition head 1000 includes a first spray module 1002 fed via pipe 1004 from a reservoir 1006 containing a mixture of at least one of a liquid crystal and a monomer, which is dispersed into the spray jet 1008 by the spray module 1002 for coating a transparent substrate. The substrate has predefined regions for supporting gratings. There is also provided an X-Y displacement controller 1010 for traversing the spray module across the substrate and a means for controlling the spray characteristics from the module over each grating region to deposit a film that provides a predefined grating characteristic within the grating region following holographic exposure. The holographic exposure may be carried out using any current holographic process, include any of the processes disclosed in the reference documents. In the illustrative embodiment, the deposition head 1000 further includes a mixture controller 1012 for controlling one or more of the temperature, dilution and relative concentrations of chemical components of the mixture. The deposition head 1000 can also include a spray controller 1014 for controlling one or more of the spray angle relative to the substrate, the spray divergence angle, and the durations of the spray on and off states. In several embodiments, the predefined grating characteristic includes one or more of refractive index modulation, refractive index, birefringence, liquid crystal director alignment, and grating layer thickness. As can readily be appreciated, deposition heads can be implemented and configured in many different ways. In many embodiments, any combination and subset of the X-Y displacement controller, mixture controller, and spray controller can be utilized. In some embodiments, additional controllers are utilized to configure the spraying mechanism and the material deposited.

Figure 11:
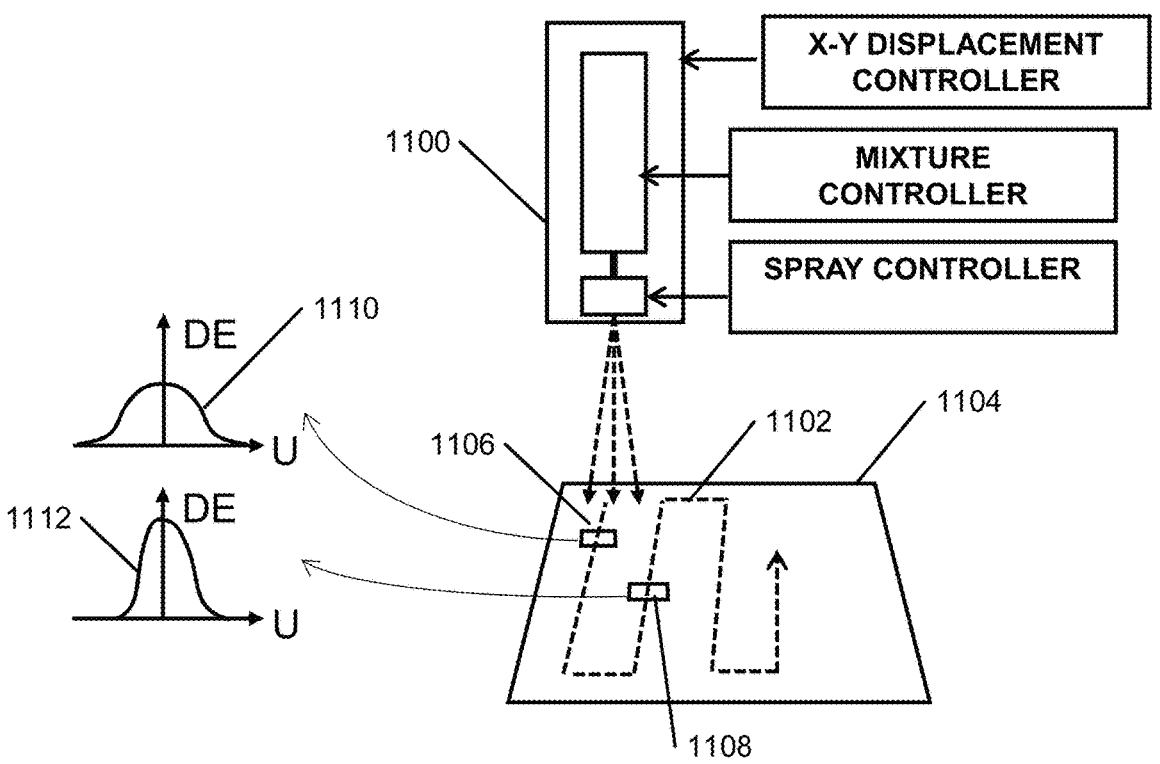
FIG. 11 conceptually illustrates operation of a deposition head for depositing material having regions with predefined grating characteristics in accordance with an embodiment of the invention.

FIG. 11 conceptually illustrates operation of a deposition head for depositing material having regions with predefined grating characteristics in accordance with an embodiment of the invention. As discussed above, the deposition head can be configured to deposit material having a spatial variation across the grating region of one or more of refractive index modulation, refractive index, birefringence, liquid crystal director alignment and grating layer thickness. As shown in FIG. 11, the spray module 1100 follows a spraying path 1102 across the substrate 1104. The spray can be dynamically controlled during transit along the path 1102 to vary the predefined grating characteristics in areas of the predefined grating regions such as 1106, 1108, for example. In some embodiments, the deposition mechanism provides, after exposure, a grating with a spatially varying diffraction efficiency. For example, referring again to FIG. 11, the coating areas 1106, 1108 (after holographic exposure) exhibit diffraction efficiency (DE) versus angle (U) characteristics represented by the curves 1110, 1112 respectively.

Figure 12:
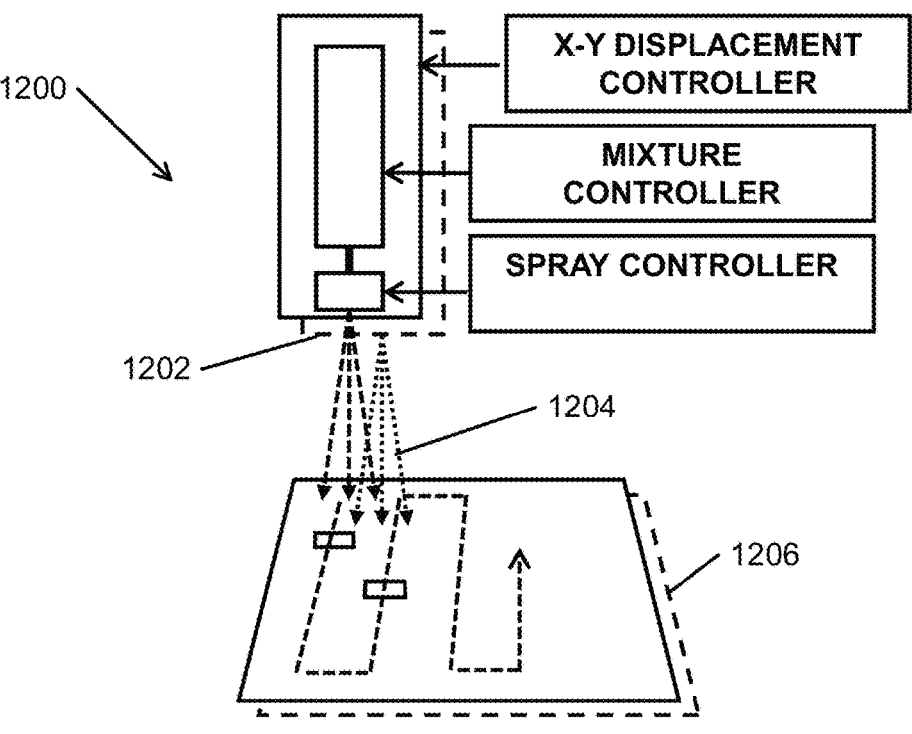
FIG. 12 conceptually illustrates a deposition mechanism for depositing two grating layers in accordance with an embodiment of the invention.

FIG. 12 conceptually illustrates a deposition mechanism for depositing two grating layers in accordance with an embodiment of the invention. As shown, the system 1200 is similar to that of FIG. 11 but further includes a second spray module 1202 providing a jet 1204 for coating the second grating layer 1206. In many embodiments, the grating layers are coated using different mixture compositions. In some embodiments, similar to the one of FIG. 7A, the system includes a first spray module connected to a first reservoir containing a first mixture that includes at least one of a first liquid crystal and a first monomer and a second spray module connected to a second reservoir containing a second mixture that includes at least one of a second liquid crystal and a second monomer.

Figure 13:
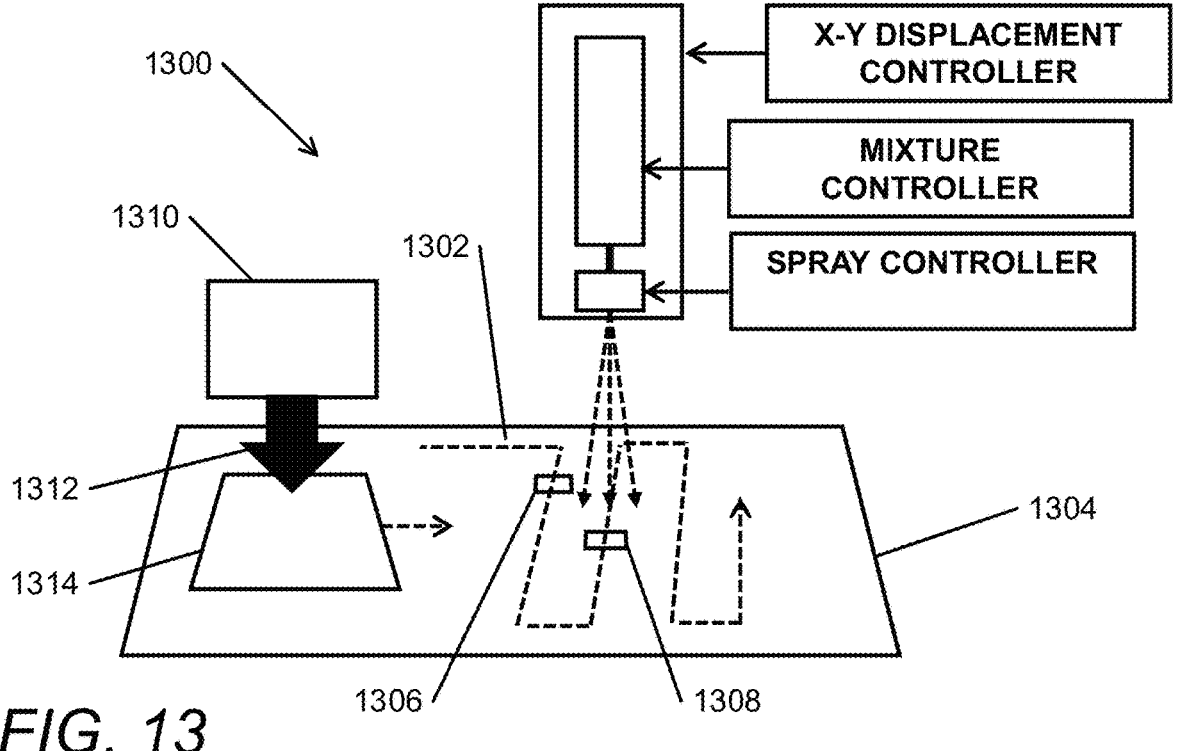
FIG. 13 conceptually illustrates a system for depositing a grating layer of material and for holographically exposing the layer in accordance with an embodiment of the invention.

FIG. 13 conceptually illustrates a system for depositing a grating layer of material and for holographically exposing the layer using recording beams with on and off states synchronized with the coating module. As shown, the system 1300 includes a coating apparatus similar to that of FIG. 12 following a spraying path 1302 across the substrate 1304 providing predefined grating regions 1306, 1308. While the coating process is taking place, a holographic exposure apparatus 1310, which provides a recording beam 1312, can expose coated predefined grating regions 1314. In many embodiments, the holographic exposure apparatus is based on a master grating which contact copies the required grating into the predefined grating region.

FIG. 14 is a flow chart conceptually illustrating a method of depositing a film of material with regions having predefined grating characteristics in accordance with an embodiment of the invention. As shown, the method 1400 includes providing (1402) a transparent substrate for coating. A grating supporting and non-grating-supporting regions of the substrate can be defined (1404). A mixture containing a liquid crystal and monomer can be provided (1406). In several embodiments, the material utilized includes one or more of a photoinitiator, nano-particles, low-functionality monomers, additives for reducing switching voltage, additives for reducing switching time, additives for increasing refractive index modulation and additives for reducing haze. A spray module for coating the mixture onto the substrate can be provided (1408). The spray module can be set (1410) to its starting position (k=1). The spray module can be moved (1412) to the current position over the substrate. A decision can be made (1414) on whether the current coating apparatus is positioned over a grating supporting region or a non-grating-supporting region. If the coating apparatus is over a grating region, the spray module can be activated (1416) to provide a spray characteristic for achieving a predefined grating characteristic within the grating region. The grating region can be coated (1418). A decision can be made (1420) regarding the coating status. If all specified regions have been coated, the process can be terminated (1422). If all specified regions have not been coated, the next region to be coated can be selected (1424) and the deposition steps can be repeated with k incremented.

Although FIGS. 10-14 illustrate specific implementations and methods of depositing material with regions having predefined grating characteristics, any of a variety of configurations can be implemented. For example, in many embodiments, multiple spray modules or deposition heads are utilized. Various predefined grating characteristics can be controlled and/or modulated depending on the specific application. Modulation of material composition utilizing more than one deposition head is discussed below in further detail.

As discussed above, deposition processes can be configured to deposit optical recording material that varies spatially in component composition. Modulation of material composition can be implemented in many different ways. In a number of embodiments, an inkjet print head can be configured to modulate material composition by utilizing the various inkjet nozzles within the print head. By altering the composition on a "dot-by-dot" basis, the layer of optical recording material can be deposited such that it has a varying composition across the planar surface of the layer. Such a system can be implemented using a variety of apparatuses including but not limited to inkjet print heads. Similar to how color systems use a palette of only a few colors to produce a spectrum of millions of discrete color values, such as the CMYK system in printers or the additive RGB system in display applications, inkjet print heads in accordance with various embodiments of the invention can be configured to print optical recording materials with varying compositions using only a few reservoirs of different materials. Different types of inkjet print heads can have different precision levels and can print with different resolutions. In many embodiments, a 300 DPI ("dots per inch") inkjet print head is utilized. Depending on the precision level, discretization of varying compositions of a given number of materials can be determined across a given area. For example, given two types of materials to be printed and an inkjet print head with a precision level of 300 DPI, there are 90,001 possible discrete values of composition ratios of the two types of materials across a square inch for a given volume of printed material if each dot location can contain either one of the two types of materials. In some embodiments, each dot location can contain either one of the two types of materials or both materials. In several embodiments, more than one inkjet print head is configured to print a layer of optical recording material with a spatially varying composition. Although the printed dots for a two-material application are essentially a binary system, in practical applications, averaging the printed dots across an area can allow for discretization of a sliding scale of ratios of the two materials to be printed.

Figure 15:
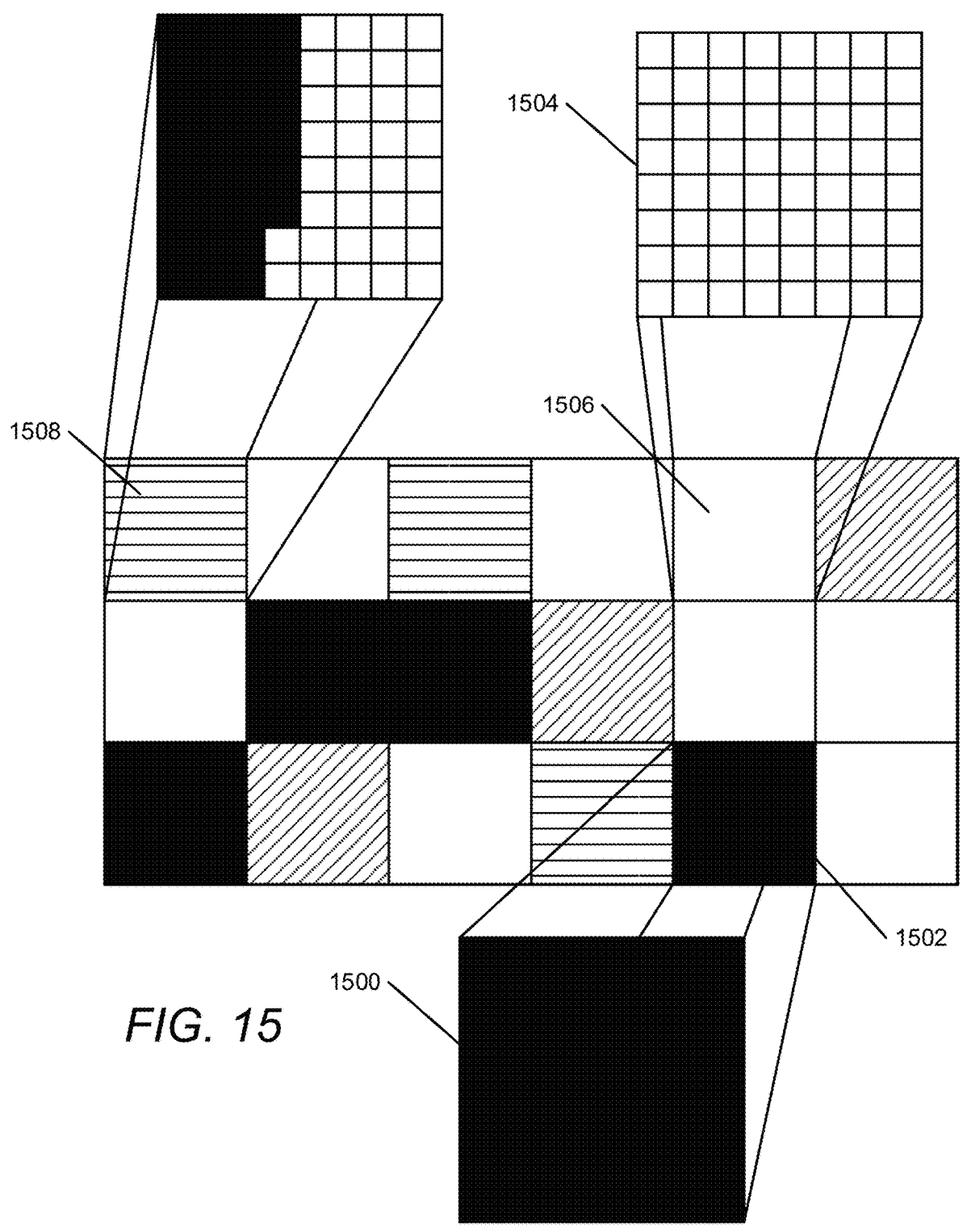
FIG. 15 conceptually illustrates an inkjet printing modulation scheme in accordance with an embodiment of the invention.

FIG. 15 conceptually illustrates an inkjet printing modulation scheme in accordance with an embodiment of the invention. As shown, eighteen discrete unit-squares are each capable of being printed with a varying ratios of two different types of materials. In the illustrated embodiment, the inkjet print head is capable of printing sixty-four dots within each of the eighteen unit squares. Each dot can be printed with either one of two types of material. A close up 1500 of unit square 1502 shows that all sixty-four dot locations within the unit square is printed with the first material. Similarly, a close up 1504 of unit square 1506 is printed completely with the second material. Unit square 1508 shows an intermediate composition where thirty out of the sixty-four dot locations are printed with the first material while the remaining dot locations are printed with the second material. As such, unit square 1508, as a whole, contains an intermediate level of concentrations from both materials. Utilizing this modulation scheme, any pattern of varying material characteristics can be achieved.

The amount of discrete levels of possible concentrations/ratios across a unit square is given by how many dot locations can be printed within the unit square. In the illustrative embodiment, sixty-four discrete dots can be printed within the unit square, which thus results in each unit square having a possibility of sixty-five different concentration combinations, ranging from 100% of the first material to 100% of the second material. Although FIG. 15 discusses the areas in terms of a unit square, the concepts are applicable to real units and can be determined by the precision level of the inkjet print head. Although specific examples of modulating the material composition of the printed layer are discussed, it can readily be appreciated that the concept of modulating material composition using inkjet print head can be expanded to use more than two different material reservoirs and can vary in precision levels, which largely depends on the type of print head used.

Varying the composition of the material printed can be advantageous for several reasons. For example, in many embodiments, varying the composition of the material during deposition can allow for a waveguide with gratings that have varying diffraction efficiencies across different areas of the gratings. In embodiments utilizing HPDLC mixtures, this can be achieved by modulating the relative concentration of liquid crystals in the HPDLC mixture during the printing process, which creates compositions that can produce gratings with varying diffraction efficiencies when exposed. In several embodiments, a first HPDLC mixture with a certain concentration of liquid crystals and a second HPDLC mixture that is liquid crystal-free are used as the printing palette in an inkjet print head for modulating the diffraction efficiencies of gratings that can be formed in the printed material. In such embodiments, discretization can be determined based on the precision of the inkjet print head. For example, if a 150 DPI inkjet print head is utilized, each square inch can be printed with 22,501 discrete levels of liquid crystal concentration. A discrete level can be given by the concentration/ratio of the materials printed across a certain area. In this example, the discrete levels range from no liquid crystal to the maximum concentration of liquid crystals in the first PDLC mixture.

The ability to vary the diffraction efficiency across a waveguide can be used for various purposes. Waveguides are typically designed such that light can be reflected many times between the two planar surfaces of a waveguide. These multiple reflections can allow for a light path to interact with a grating multiple times. In many embodiments, a waveguide cell can be printed with varying compositions such that the gratings formed from the optical recording material layer have varying diffraction efficiencies to compensate for the loss of light during interactions with the gratings to allow for a uniform output intensity. For example, in some waveguide applications, an output grating is configured to provide exit pupil expansion in one direction while also coupling light out of the waveguide. The output grating can be designed such that when light within the waveguide interact with the grating, only a percentage of the light is refracted out of the waveguide. The remaining portion continues in the same light path, which remains within TIR and continues to be reflected within the waveguide. Upon a second interaction with the same output grating again, another portion of light is refracted out of the waveguide. During each refraction, the amount of light still traveling within the waveguide decreases by the amount refracted out of the waveguide. As such, the portions refracted at each interaction gradually decreases in terms of total intensity. By varying the diffraction efficiencies of the grating such that it increases with propagation distance, the decrease in output intensity along each interaction can be compensated, allowing for a uniform output intensity.

Varying the diffraction efficiency can also be used to compensate for other attenuation of light within a waveguide. All objects have a degree of reflection and absorption. Light trapped in TIR within a waveguide are continually reflected between the two surfaces of the waveguide. Depending on the material that makes up the surfaces, portions of light can be absorbed by the material during each interaction. In many cases, this attenuation is small, but can be substantial across a large area where many reflections occur. In many embodiments, a waveguide cell can be printed with varying compositions such that the gratings formed from the optical recording material layer have varying diffraction efficiencies to compensate for the absorption of light from the substrates. Depending on the substrates, certain wavelengths can be more prone to absorption by the substrates. In a multi-layer waveguide design, each layer can be designed to couple in a certain range of wavelengths of light. Accordingly, the light coupled by these individual layers can be absorbed in different amounts by the substrates of the layers. For example, in a number of embodiments, the waveguide is made of a 3-layer stack to implement a color display, where each layer is designed for one of Red, Green, and Blue. In such embodiments, gratings within each of the waveguide layers can be formed to have varying diffraction efficiencies to perform color balance optimization by compensating for color imbalance due to loss of transmission of certain wavelengths of light.

In addition to varying the liquid crystal concentration within the material in order to vary the diffraction efficiency, another technique includes varying the thickness of the waveguide cell. This can be accomplished through the use of beads. In many embodiments, beads are dispersed throughout the optical recording material for structural support during the construction of the waveguide cell. In some embodiments, different sizes of beads are dispersed throughout the optical recording material. The beads can be dispersed in ascending order of sizes across one direction of the layer of optical recording material. When the waveguide cell is constructed through lamination, the substrates sandwich the optical recording material and, with structural support from the varying sizes of beads, create a wedge shaped layer of optical recording material. Beads of varying sizes can be dispersed similar to the modulation process described above. Additionally, modulating bead sizes can be combined with modulation of material compositions. In several embodiments, reservoirs of HPDLC materials each suspended with beads of different sizes are used to print a layer of HPDLC material with beads of varying sizes strategically dispersed to form a wedge shaped waveguide cell. In a number of embodiments, bead size modulation is combined with material composition modulation by providing an amount of reservoirs equal to the product of the number of different sizes of beads and the number of different materials used. For example, in one embodiment, the inkjet print head is configured to print varying concentrations of liquid crystal with two different bead sizes. In such an embodiment, four reservoirs can be prepared: a liquid crystal-free mixture-suspension with beads of a first size, a liquid crystal-free mixture-suspension with beads of a second size, a liquid crystal-rich mixture-suspension with beads of a first size, and a liquid crystal-rich mixture-suspension with beads of a second size.

Lamination Workcell

In many embodiments, the workcell cluster includes a lamination workcell for laminating the waveguide cell. After the deposition of optical recording material onto a substrate, a second substrate can be placed onto the optical recording material, creating a three-layer composite. Oftentimes, the second substrate will be made of the same material and in the same dimensions as the first substrate. In many embodiments, the deposition workcell is configured to place the second substrate onto the optical recording material. In other embodiments, the lamination workcell is configured to place the second substrate onto the optical recording material. The second substrate can be placed manually or through the use of mechanical arms and/or suction mechanisms. Once the second substrate is placed, the three-layer composite may be too unstable to handle manually and, thus, in many embodiments, a laminator is implemented to compact the composite.

The three-layer composite can be laminated in various ways. In many embodiments, a press is implemented to provide downward pressure onto the composite. In other embodiments, the lamination workcell is configured to feed the composite through a roller laminator. The compacted composite and adhesion properties of the optical recording material can result in a waveguide cell with enough stability to be handled manually. In some embodiments, the layer of optical recording material includes beads. Consequently, these relatively incompressible beads can define the height of the layer of optical recording material within the compacted composite. As discussed in the sections above, differently sized beads can be placed throughout the optical recording material. Upon lamination, the sizes of the beads can each determine the local thickness of the waveguide cell. By varying the sizes of the beads, a wedge shaped waveguide cell can be constructed. As can readily be appreciated, the lamination of the substrates-optical recording material layer composite can be achieved using lamination workcells that can be configured and implemented in many different ways. In several embodiments, the lamination workcell is a modular workcell within the workcell cluster. In other embodiments, the lamination workcell is simply a laminator implemented within the deposition workcell, such as the one shown in FIGS. 3A and 3B.

Although specific systems and methods for manufacturing waveguide cells are discussed above, many different configurations can be implemented in accordance with many different embodiments of the invention. It is therefore to be understood that the present invention can be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A system for fabricating a grating, the system comprising:

a deposition head connected to a reservoir containing a mixture of optical recording material;

a first substrate having at least one predefined region for supporting gratings;

a positioning element capable of positioning the at least one deposition head across the first substrate;

a holographic exposure apparatus for exposing the first substrate, wherein:

the deposition head is configured to deposit the mixture of optical recording material onto the first substrate using the positioning element, the holographic exposure apparatus is configured to holographically expose the at least one predefined region of the first substrate after the mixture of optical recording material is deposited onto the first substrate, and the deposited material provides a predefined grating characteristic within the at least one predefined region after holographic exposure.

2. The system of claim 1, wherein the deposition head is connected to a first reservoir containing a first mixture of optical recording material and a second reservoir containing a second mixture of optical recording material.

3. The system of claim 2, wherein the first mixture of optical recording material comprises a liquid crystal and a monomer; and the second mixture of optical recording material comprises a monomer; wherein the at least one deposition head is configured to deposit the first mixture of optical recording material onto the at least one predefined grating region.

4. The system of claim 1, wherein the deposition head comprises a inkjet print head.

5. The system of claim 1, wherein the predefined grating characteristic comprises a characteristic selected from the group consisting of: refractive index modulation, refractive index, birefringence, liquid crystal director alignment, and grating layer thickness.

6. The system of claim 1, wherein the predefined grating characteristic results in a grating after holographic exposure, the grating having a spatially varying diffraction efficiency.

* * * * *